(12) United States Patent
Miki

(10) Patent No.: US 7,898,184 B2
(45) Date of Patent: Mar. 1, 2011

(54) LIGHTING CONTROL SYSTEM AND CONTROL SYSTEM

(75) Inventor: Mitsunori Miki, Kyoto (JP)

(73) Assignee: The Doshisha, Kamigyo-ku (JP)

( * ) Notice: Subject to any disclaimer, the term of this patent is extended or adjusted under 35 U.S.C. 154(b) by 0 days.

(21) Appl. No.: 12/500,234

(22) Filed: Jul. 9, 2009

(65) Prior Publication Data

US 2009/0319057 A1  Dec. 24, 2009

Related U.S. Application Data

(62) Division of application No. 10/567,081, filed as application No. PCT/JP2004/003454 on Mar. 15, 2004, now Pat. No. 7,635,958.

(30) Foreign Application Priority Data

Aug. 4, 2003  (JP) .............................. 2003-285901

(51) Int. Cl.
    *H05B 37/02*  (2006.01)
(52) U.S. Cl. ................... 315/149; 315/308; 315/312
(58) Field of Classification Search ................. 315/149, 315/210, 291, 307–308, 312, 317, 318, 324
    See application file for complete search history.

(56) References Cited

U.S. PATENT DOCUMENTS

| | | | |
|---|---|---|---|
| 5,627,527 A | 5/1997 | Mehta | |
| 6,198,230 B1 | 3/2001 | Leeb et al. | |
| 2005/0110416 A1 * | 5/2005 | Veskovic | 315/149 |
| 2005/0151489 A1 * | 7/2005 | Lys et al. | 315/308 |

FOREIGN PATENT DOCUMENTS

| | | |
|---|---|---|
| JP | 2001-52879 A | 2/2001 |
| JP | 2003-100470 A | 4/2003 |

OTHER PUBLICATIONS

Mitsunori Miki et al., "Design of Intelligent Lighting System", The Science and Engineering Review of Doshisha University, vol. 39, No. 2, pp. 24-34, Jul. 1998.
International Search Report mailed on Jul. 6, 2004.

* cited by examiner

*Primary Examiner*—Douglas W Owens
*Assistant Examiner*—Tung X Le
(74) *Attorney, Agent, or Firm*—Rader, Fishman & Grauer PLLC

(57) ABSTRACT

The present invention includes a lighting control system provided with two or more lighting devices and one or more illumination comparing devices; wherein the illumination comparing device supplies to the lighting devices a comparison result in which a sampled illumination of an arbitrary position and a target illumination are compared; the two or more lighting devices carry out a judgment based on the comparison result obtained from the illumination comparing device and repetitively increase/decrease their respective light intensities; and the illumination of the arbitrary position is substantially controlled to the target illumination, and with this lighting control system, a predetermined position can be controlled to a desired illumination.

19 Claims, 11 Drawing Sheets

| light intensity of lighting device j | evaluation value of illumination difference |
|---|---|
| 200 | −37 |
| 1000 | 48 |
| 300 | −22 |
| 600 | 14 |
| 100 | −35 |
| 400 | −8 |
| 500 | −2 |
| 900 | 43 |
| 700 | 18 |
| 800 | 33 |
| 200 | −18 |
| ~ | ~ |
| ~ | ~ |
| ~ | ~ |
| ~ | ~ |

LIGHTING CONTROL SYSTEM AND CONTROL SYSTEM

This application is a divisional of U.S. application Ser. No. 10/567,081 filed on Feb. 3, 2006, which is an application under 35 U.S.C. §371 of PCT/JP04/03454 filed on Mar. 15, 2004, which claims the benefit of foreign priority patent application No. 2003-285901 filed Aug. 4, 2003 in Japan.

TECHNICAL FIELD

The present invention includes a lighting control system and relates to intelligent lighting control systems that are capable of illumination control and illumination management for flexible lighting and control systems.

BACKGROUND ART

With conventional lighting systems, when numerous light sources are provided in a hall for example, the light intensities of the light sources are adjusted individually to set the illumination appropriately for numerous locations inside the hall. With such a technique, it is necessary repetitively adjust each of the light sources using trial and error to set the illumination at a predetermined position to a desired value. Also, it is necessary to adjust the light intensity of each of the light sources regularly or for each performance in accordance with the changing over time of the illumination of the lamps. Similarly, adjustments are necessary when the illuminant has degraded and is replaced. And in conference rooms or the like, the immediate optimal illumination varies when outside light from a window varies.

On the other hand, systems capable of sensing the condition of each light source, detecting malfunctions, and remotely controlling the respective illuminations of the light sources are known as intelligent lighting systems (for example see *Shomei Shisutemu no Chitekika Sekkei* (Incorporating Greater Intelligence in the Design of Lighting Systems), Mitsunori Miki and Takafumi Kozai, Doshisha University, Science and Engineering Research Report, July 1998, Volume 39, No. 2, pp 24-34).

However, even with systems such as that described in the aforementioned document, in order to set a desired illumination in desired locations in audience seats and on stage, trial and error and adjustments have been necessary as with conventional systems.

On the other hand, although commonly known automatic control may be used to adjust a single point of illumination of a single light source to a predetermined target value, in cases such as where a plurality of light sources are used and the overall illumination distribution in a room is to be set to a desired condition, it has not been easy to solve the issues of adjusting a plurality of control targets to set and maintain a condition in which a plurality of target values are met.

DISCLOSURE OF INVENTION

An object of the present invention is to provide a lighting control system capable of setting the illumination of a predetermined position to a desired illumination using a plurality of lighting devices in places such as in a hall, in an ordinary room, and outdoors. Furthermore, it is an object to provide a control system that is compatible with similar issues.

In order to solve the above-described issues and achieve the relevant objects, systems including the lighting control system of the present invention employ the following means.

(1) A lighting control system, comprising two or more lighting devices and one or more illumination comparing devices, wherein the illumination comparing device supplies to the lighting devices a comparison result in which a sampled illumination of an arbitrary position and a target illumination are compared, the two or more lighting devices carry out a judgment based on the comparison result obtained from the illumination comparing device and repetitively increase/decrease their respective light intensities, and the illumination of the arbitrary position is substantially controlled to the target illumination.

(2) A lighting control system, comprising two or more lighting devices and one or more illumination comparing devices, wherein the illumination comparing device supplies to the lighting devices a comparison result in which a sampled illumination of an arbitrary position and a target illumination are compared, the illumination comparing device does not specify a lighting device when supplying the comparison result to the lighting devices, the two or more lighting devices carry out a judgment based on the comparison result obtained from the illumination comparing device and repetitively increase/decrease their respective light intensities, and the illumination of the arbitrary position is substantially controlled to the target illumination.

(3) A lighting control system, comprising two or more lighting devices and one or more illumination comparing devices, wherein the illumination comparing device is provided with an illumination sampling portion that samples illumination, an illumination information storage portion that stores illumination information indicating a target illumination, and a comparison result transmitter portion, wherein a comparison result in which a sampled illumination sampled by the illumination sampling portion and the illumination information are compared is transmitted to the lighting devices by the comparison result transmitter portion, the lighting devices are respectively provided with a transmitter-receiver portion having at least a receiver function, a judgment control portion, and a light source; the transmitter-receiver portion receives the comparison result sent by the illumination comparing device; the judgment control portion carries out a predetermined judgment based on the comparison result so that the light intensity of the light source can be controlled based on a result of the predetermined judgment, and the control of the light intensity includes light variation control in which the light intensity is changed from a current light intensity by a predetermined amount of light variation and return control in which a light intensity is returned to a direction reverse to the light variation control, and when the predetermined judgment of the selected lighting device is that a predetermined condition is met after at least one lighting device selected from the lighting devices has carried out the light variation control, a lighting device including at least one lighting device other than the selected lighting device is selected and a predetermined judgment is carried out in the selected lighting device using the light variation control and the judgment control portion such that when the predetermined judgment after the light variation control is that the predetermined condition is unmet, the lighting device including at least one of the selected lighting devices carries out the return control in order to meet the predetermined condition to make the sampled illumination approach the target illumination.

(4) The lighting control system according to (3), wherein when the predetermined condition is unmet, a light intensity of a lighting device including at least one of the selected lighting devices is changed by the return control and, after the predetermined condition becomes met, the sampled illumination is made to approach the target illumination by shifting to selection of a lighting device including at least one of a lighting device other than the selected lighting device.

(5) The lighting control system according to (3) or (4), wherein the lighting devices including at least one of the selected lighting devices are all the lighting devices of the two or more lighting devices.

(6) A lighting control system, having two or more lighting devices and one or more illumination comparing devices, wherein the illumination comparing device is provided with an illumination information storage portion that stores at least one piece of illumination information indicating a target illumination, at least one illumination sampling portion that samples an illumination, and a judgment portion that judges a relation between the target illumination indicated by the illumination information and a sampled illumination sampled by the illumination sampling portion, wherein the judgment portion supplies the judgment result to the lighting devices, the lighting devices are respectively provided with a judgment control portion and a light source, wherein the judgment control portion carries out a predetermined judgment based on the acquired judgment result so that the light intensity of the light source can be controlled based on a result of the predetermined judgment, and the control of the light intensity includes light variation control in which the light intensity is varied from a current light intensity by a predetermined amount of light variation and return control in which a return is made in a direction reverse to the light variation control, the judgment control portion carries out the predetermined judgment after at least one selected lighting device from the lighting devices carries out the light variation control at least one time, after which a lighting device including at least one lighting device other than the selected lighting device is selected and, after the light variation processing has been carried out at least one time in the selected lighting device, and the judgment control portion carries out the predetermined judgment and when the predetermined judgment is that the predetermined condition is unmet, the lighting device including at least one of the selected lighting devices carries out the return control to make the sampled illumination approach the target illumination in order to meet the predetermined condition.

(7) A lighting control system, having two or more lighting devices and two or more illumination comparing devices, wherein the illumination comparing device is provided with an illumination information storage portion that stores illumination information indicating a target illumination, an illumination sampling portion that samples an illumination, and a judgment portion that judges a relation between the target illumination indicated by the illumination information and a sampled illumination sampled by the illumination sampling portion, wherein the judgment portion supplies the judgment result to the lighting devices, the lighting devices are respectively provided with a judgment control portion and a light source, wherein the judgment control portion carries out a predetermined judgment based on the acquired judgment result so that the light intensity of the light source can be controlled based on a result of the predetermined judgment, and the control of the light intensity includes light variation control in which the light intensity is varied from a current light intensity by a predetermined amount of light variation and return control in which a return is made in a direction reverse to the light variation control, and the judgment control portion carries out the predetermined judgment after at least one selected lighting device from the lighting devices carries out the light variation control at least one time, after which a lighting device including at least one lighting device other than the selected lighting device is selected and, after the light variation processing has been carried out at least one time in the selected lighting device, the judgment control portion carries out the predetermined judgment and when the predetermined judgment is that the predetermined condition is unmet, the lighting device including at least one of the selected lighting devices carries out the return control to make the sampled illumination approach the target illumination in order to meet the predetermined condition.

(8) The lighting control system according to (6) or (7), wherein after at least one of the two or more lighting devices is selected and a light intensity is subjected to the light variation control, when the predetermined condition is judged to be met according the predetermined judgment of the judgment control portion of the selected lighting device, the sampled illumination is made to approach the target illumination by shifting to the light variation control of a light intensity of a light source of a lighting device including at least one of a lighting device other than the selected lighting device, and when the predetermined condition is judged to be unmet, the light intensity of the light source of the lighting device including at least one of the selected lighting devices is subjected to return control to meet the predetermined condition, after which a lighting device including at least one lighting device other than the selected lighting device is selected and light variation control is carried out to make the sampled illumination approach the target illumination.

(9) The lighting control system according to (6) or (7), wherein at least one lighting device of the two or more lighting devices is selected and light variation control is performed until the predetermined condition becomes unmet, and when the predetermined condition becomes unmet, a light intensity of a light source of a lighting device including at least at one of the selected lighting devices is subjected to return control to meet the predetermined condition, after which a lighting device including at least one lighting device other than the selected lighting device is selected and light variation control is carried out to perform control such that the sampled illumination is made to approach the target illumination.

(10) The lighting control system according to (8) or (9), wherein the lighting devices, including at least one of the selected lighting devices that are subjected to the return control, are all the lighting devices of the two or more lighting devices.

(11) The lighting control system according to (6) or (7), wherein at least one lighting device of the two or more lighting devices is selected and light variation control is performed until the predetermined condition becomes unmet, and when the predetermined condition becomes unmet, light intensities of light sources of the two or more lighting devices excluding the selected lighting device are subjected to light variation control, and when a reverse relation to when the sampled illuminations are in the constant relation with the target illuminations does not occur, the light intensities of light sources of the two or more lighting devices excluding the selected lighting device are subjected to return control and after return control is conducted such that the light intensity of the light source of the selected lighting device returns to the predetermined direction, at least one lighting device different from the selected lighting device is selected and light variation control is carried out to perform control such that the sampled illuminations are made to approach the target illuminations.

(12) A lighting control system, comprising two or more lighting devices and one or more illumination comparing devices, wherein the illumination comparing device is provided with an illumination sampling portion that samples illumination, an illumination information storage portion that stores illumination information indicating a target illumination, and a comparison result transmitter portion, wherein a comparison result in which a sampled illumination sampled by the illumination sampling portion and the illumination information are compared is transmitted to the lighting devices by the comparison result transmitter portion, the lighting devices are respectively provided with a transmitter-receiver portion having at least a receiver function, a judgment control portion, and a light source; the transmitter-receiver portion receives the comparison result sent by the illumination comparing device; the judgment control portion carries out a predetermined judgment based on the comparison result so that the light intensity of the light source can be controlled based on a result of the predetermined judgment, and the control of the light intensity includes light variation control in which the light intensity is changed from a current light intensity and return control in which a light intensity is returned to a direction reverse to the light variation control, the lighting devices respectively carry out the light variation control and, after the light variation control, when the predetermined judgment is that a predetermined condition is unmet, the lighting devices carry out the return control in order to meet the predetermined condition, in the lighting devices, the sampled illuminations are made to approach the target illumination by setting an amount of light variation in the light variation control as one of an amount varied randomly based on a predetermined amount of light variation, an amount that is a return amount of light in the return control randomly varied, or an amount in which both are randomly varied.

(13) The lighting control system according to any of (3) to (12), wherein prior to selection of the lighting devices, the light intensities of the light sources of all the lighting devices are set to a maximum light intensity or a minimum light intensity capable of being produced by all the lighting devices in order to meet the predetermined condition, or when the predetermined condition is not met, the light intensities of all the lighting devices are varied in a light variation direction of the return control in order to meet the predetermined condition.

(14) The lighting control system according to any of (3) to (13), wherein when there is a single illumination sampling portion in the lighting control system, the judgment control portion judges that the predetermined condition is met when the sampled illumination is in a constant relation with the target illumination and judges that the predetermined condition is unmet when the sampled illumination is not in a constant relation with the target illumination, and when there are two or more illumination sampling portions, the judgment control portion judges that the predetermined condition is met when the sampled illuminations are all in a constant relation with the corresponding target illuminations and judges that the predetermined condition is unmet when even one is not in a constant relation.

(15) The lighting control system according to (14), wherein the aforementioned "in a constant relation" is a relation in which the sampled illumination is larger than the corresponding target illumination and the predetermined amount of light variation in a case of this relation is an amount of light reduction.

(16) The lighting control system according to (14), wherein the aforementioned "in a constant relation" is a relation in which the sampled illumination is smaller than the corresponding target illumination and the predetermined amount of light variation in a case of this relation is an amount of light increase.

(17) The lighting control system according to any of (3) to (14); wherein the predetermined amount of light variation is an amount of light variation based on a difference between an initial light intensity and a threshold light intensity of a light source.

(18) The lighting control system according to (17), wherein the threshold light intensity is a light intensity of when light intensities of the two or more lighting devices are changed from the initial light intensity and the predetermined condition becomes unmet, or immediately prior to the predetermined condition becoming unmet.

(19) The lighting control system according to any of (3) to (13), wherein at least one of the predetermined amount of light variation and the return control amount of light is an amount of light variation based on a differential illumination between the sampled illumination and the target illumination.

(20) The lighting control system according to any of (3) to (13), wherein at least one of the predetermined amount of light variation and the return control amount of light is set for each of the light sources.

(21) The lighting control system according to any of (3) to (13), wherein at least one of the predetermined amount of light variation and the return control amount of light is reduced in response to a convergence in which the sampled illuminations approach the target illuminations, or reduced along with a passing of time until convergence.

(22) The lighting control system according to any of (3) to (13), wherein a selection number of the selected lighting devices is made to approach one in response to a convergence in which the sampled illuminations approach the target illuminations.

(23) A lighting control system, comprising two or more lighting devices and one or more illumination comparing devices, wherein the illumination comparing device is provided with an illumination sampling portion that samples illumination, an illumination information storage portion that stores illumination information indicating a target illumination, and a comparison result transmitter portion, wherein a comparison result, in which a sampled illumination sampled by the illumination sampling portion and the target illumination indicated by the illumination information are compared, is transmitted by the comparison result transmitter portion, the two or more lighting devices are respectively provided with a transmitter-receiver portion having at least a receiver function, a judgment control portion, and a light source; the transmitter-receiver portion receives the comparison result sent by the comparison result transmitter portion; the judgment control portion carries out a predetermined judgment based on the received comparison result so that the light intensities of the light sources can be controlled based on the judgment, the judgment control portion of at least one of the two or more lighting devices randomly changes the light intensities of the light sources and the sampled illuminations are made to approach the target illuminations by narrowing a range in which the judgment control portion randomly changes the light intensities based on the comparison result received at the transmitter-receiver portion.

(24) The lighting control system according to (23), wherein the light intensities of all the two or more lighting devices are respectively changed randomly and the sampled illumination is made to approach the target illumination by narrowing a range in which the judgment control portion randomly changes the light intensity based on the comparison result received at the transmitter-receiver portion.

(25) The lighting control system according to (23) or (24), wherein a plurality of illumination comparing devices are provided, the judgment control portions of the two or more lighting devices total the comparison results received from the plurality of illumination comparing devices to calculate an evaluation value and the sampled illuminations are made to approach the target illuminations by narrowing a range of randomly changed light intensities based on the evaluation value.

(26) The lighting control system according to any of (23) to (25), wherein the illumination comparing device compares the sampled illuminations and the corresponding target illuminations and transmits illumination difference information as the comparison result so that the received comparison result is evaluated in the judgment control portion of at least one of the lighting devices, and narrows the range in which light intensities are randomly changed so as to increase an occurrence rate of light intensities corresponding to evaluations of small illumination differences indicated by the illumination difference information and make the sampled illuminations approach the target illuminations.

(27) The lighting control system according to any of (23) to (25), wherein the illumination comparing device transmits large-small information indicating which of the sampled illumination and the corresponding target illumination is larger, and the judgment control portion of the at least one lighting device of the two or more lighting devices narrows a range in which light intensities are randomly changed so as to counterbalance large information and small information of the large-small information based on the received comparison result to make the sampled illuminations approach the target illuminations.

(28) The lighting control system according to any of (1) to (27), wherein at least one of a condition of the two or more lighting devices in light variation control and illumination information is displayed on a display.

(29) The lighting control system according to any of (1) to (27), wherein a light intensity of a light source of the lighting devices at a final stage of the convergence can be stored and the light intensity of the light source of the lighting devices can be reproduced by receiving an instruction.

(30) A light source constituted by the lighting control system according to any of (3) to (29).

(31) A lighting device constituted by the lighting control system according to any of (1) to (29).

(32) An illumination comparing device constituted by the lighting control system according to any of (1) to (29).

With the above-described configurations, a light intensity distribution can be achieved in which arbitrary points of illumination can be set to a desired illumination. Furthermore, a desired illumination can be achieved rapidly.

(33) A control system, being a control system having two or more control target devices and one or more judgment devices, wherein the judgment device is provided with a reference information storage portion that stores reference information, an observation information sampling portion that samples observation information, and a judgment portion that judges whether or not the reference information and the observation information meet a predetermined condition, and sends a judgment result of the judgment portion to the two or more control target devices, the control target devices can control a control amount based on the judgment result and the control includes variation control, in which a current control value is changed by a predetermined control amount, and return control, in which a return is made to a reverse direction to a direction of change of a predetermined control amount, and the judgment portion carries out a judgment as to whether or not the predetermined condition is met after at least one selected control target device from the control target devices carries out the variation control at least one time, after which a control target device including at least one control target device other than the selected control target device is selected and, after the variation processing has been carried out at least one time in the new selected control target device, the judgment portion of the selected control target device carries out the judgment and when the judgment portion judges that the predetermined condition is unmet, the control target devices including at least one of the selected control target devices carry out the return control to make the observation information approach the reference information in order to meet the predetermined condition.

(34) The control system according to (33), wherein after at least one control target device is selected and variation control is performed when the judgment result meets the predetermined condition, and a control target device including at least at one control target device other than the selected control target device is selected and subjected to variation control when the predetermined condition is met, and when the predetermined condition becomes unmet, return control is performed with a control amount of the control target devices including at least one control target device other than the selected control target device to meet the predetermined condition, after which a control target device including at least one control target device other than the selected control target device is selected and variation control is repeated to perform control such that all the observation information is made to approach the corresponding reference information.

(35) The control system according to (33), wherein at least one control target device is selected and the variation control is performed until the predetermined condition becomes unmet when the judgment result meets the predetermined condition, and when the predetermined condition becomes unmet, return control is performed with a control amount of the control target devices including at least one control target device other than the selected control target device to meet the predetermined condition, after which a control target device including at least at one control target device other than the selected control target device is selected and variation control is repeated to perform control such that all the observation information is made to approach the corresponding reference information.

(36) The control system according to (33), wherein at least one control target device is selected and the variation control is performed until the predetermined condition becomes unmet when the judgment result meets the predetermined condition, and when the predetermined condition becomes unmet, variation control is performed on a control amount of the control target devices excluding the selected control target devices, and when a relation reverse to the constant relation does not occur at all points of observation, control amounts of all the control target devices excluding the selected control target devices are subjected to return control in a previous direction, and after the predetermined condition becomes met by return control being conducted on the control amounts of the selected control target devices in a previous direction, a control target device including at least at one control target device other than the selected control target device is selected and variation control is repeated to perform control such that all the observation information is made to approach the corresponding reference information.

(37) A control system, being a control system having two or more control target devices and one or more judgment devices, wherein the judgment device is provided with a reference information storage portion that stores reference information, an observation information sampling portion that samples observation information, and a judgment portion that judges whether or not the reference information and the observation information meet a predetermined condition, and sends a judgment result of the judgment portion to the two or more control target devices, the control target devices can control a control amount based on the judgment result and the control includes variation control, in which a current control value is changed by a predetermined control amount, and return control, in which a return is made to a reverse direction to a direction of change of a predetermined control amount, the control target devices respectively carry out the variation control and, after the variation control, when the predetermined judgment is that a predetermined condition is unmet, the control target devices carry out the return control in order to meet the predetermined condition, and the observation information of the control target devices is made to approach the reference information by setting an amount of variation in the variation control as one of an amount varied randomly based on a predetermined amount of variation, an amount that is a return variation amount in the return control randomly varied, or an amount in which both are randomly varied.

(38) The control system according to any of (33) to (37), wherein prior to selection of the control target devices, the control amounts of all the control target devices are set to a maximum value or a minimum value in order to meet the predetermined condition, or return cool is conducted on the control amounts of all the control target devices to meet the predetermined condition.

(39) The control system according to any of (33) to (38), wherein when the reference information storage portion stores a single set of reference information, and the observation information sampling portion samples a single set of observation information, the judgment result is that the predetermined condition is met when the observation information and the corresponding reference information are in a constant relation, and the judgment result is that the predetermined condition is unmet when not in a constant relation, and when the reference information storage portion stores two or more sets of reference information and the observation information sampling portion samples two or more sets of observation information, the judgment result is that the predetermined condition is met when the two or more sets of observation information are all in a constant relation with the corresponding two or more sets of reference information, and the judgment result is that the predetermined condition is unmet when even one is not in a constant relation.

(40) The control system according to (39), wherein the "in a constant relation" is a relation in which the observation information is larger than the corresponding reference information and in case of this relation the variation control is a control in which the observation information is lowered.

(41) The control system according to (39), wherein the "in a constant relation" is a relation in which the observation information is smaller than the corresponding reference information and in case of this relation the variation control is a control in which the observation information is increased.

(42) The control system according to any of (33) to (41), wherein a control width of at least one of the control amount of the control target device and a control amount of the return control is set for each of the control target devices.

(43) The control system according to any of (33) to (42), wherein a control width of at least one of the control amount of the control target device and a control amount of the return control is reduced in response to a convergence, or reduced along with a passing of time until convergence.

(44) The control system according to any of (33) to (43), wherein a selection number of the selected control target devices is made to approach one in response to a convergence.

(45) A control system, being a control system having two or more control target devices, a judgment device, and an observation information sampling portion, wherein the judgment device is provided with a reference information storage portion that stores reference information, an observation information sampling portion that samples observation information, and a comparison portion that compares the reference information and the observation information, and sends a comparison result to the control target devices, the control target device control a control amount based on the judgment result, and at least one of the control target devices randomly changes the amount of control and the observation information is made to approach the reference information by narrowing a range in which the judgment control portion randomly changes the amount of control based on the received comparison result.

(46) The control system according to (45), wherein all the control target devices randomly change the respective amount of control and the observation information is made to approach the reference information by narrowing a range in which the control target devices randomly change the control amounts based on the received comparison result.

(47) The control system according to (45) or (46), wherein a plurality of judgment devices are provided, the control target devices total the comparison results received from the plurality of judgment devices to calculate an evaluation value and the observation information is made to approach the reference information by narrowing a range of randomly changed control amounts based on the evaluation value.

(48) The control system according to any of (45) to (47), wherein the judgment device compares the observation information and the reference information in the comparison portion and sends difference information as the comparison result so that the received comparison result is evaluated in at least one of the control target devices, and narrows the range in which the control amounts are randomly changed so as to increase an occurrence rate of control amounts corresponding to evaluations of small difference information to make the observation information approach the reference information.

(49) The control system according to any of (45) to (47), wherein the judgment device transmits large-small information indicating which of the observation information and the reference information is larger, and at least one of the control target devices counterbalances large information and small information of the large-small information based on the received comparison result to narrow a range in which the control amounts are randomly changed so as to make the observation information approach the reference information.

(50) A control target device constituted by the control system according to any of (33) to (49).

(51) A judgment device constituted by the control system according to any of (33) to (49).

BRIEF DESCRIPTION OF THE DRAWINGS

FIG. 5 shows an example of an evaluation value table used in a lighting control system according to the present invention.

BEST MODE FOR CARRYING OUT THE INVENTION

Figure 1:
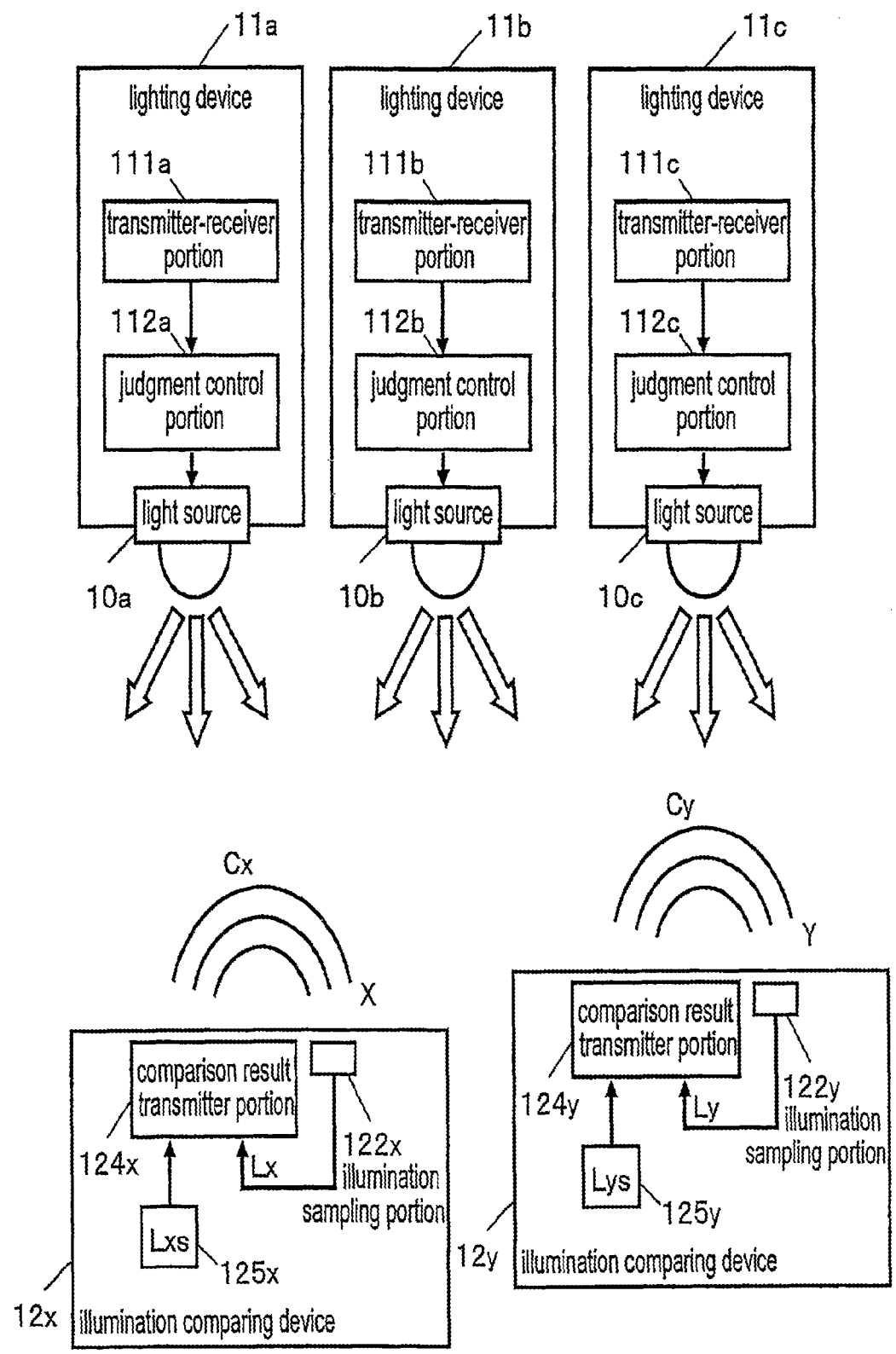
FIG. 1 is a block diagram of one embodiment of a lighting control system according to the present invention.

A lighting control system according to the present invention is provided with two or more lighting devices and one or more illumination comparing devices, wherein the illumination comparing device supplies to the lighting devices a comparison result in which a sampled illumination of an arbitrary position and a target illumination are compared, the two or more lighting devices carry out a judgment based on the comparison result obtained from the illumination comparing device and repetitively increase/decrease their respective light intensities, and the illumination of the arbitrary position is substantially controlled to the target illumination. The illumination comparing device may or may not specify a lighting device when supplying the comparison result to the lighting devices.

Hereinafter, embodiments of a lighting control system according to the present invention will be described with reference to the accompanying drawings. It should be noted that structural elements to which identical reference numerals are attached in the embodiments carry out identical operations, and therefore duplicate description may be omitted.

Embodiment 1

FIG. 1 is a block diagram showing a lighting control system according to the present invention. In FIG. 1, description concerns controlling illumination of predetermined locations based on three light sources, light sources 10a, 10b, and 10c.

In FIG. 1, a lighting device 11a has a transmitter-receiver portion 111a, a judgment control portion 112a, and the light source 10a. A lighting device 11b has a transmitter-receiver portion 111b, a judgment control portion 112b, and the light source 10b. A lighting device 11c has a transmitter-receiver portion 111c, a judgment control portion 112c, and the light source 10c. The transmitter-receiver portions 111a, 111b, and 111c receive comparison results, which will be described later, and carry out communication among the transmitter-receiver portions. The judgment control portions 112a, 112b, and 112c carry out a predetermined judgment according to an algorithm, which will be described later, and control the respective light intensities of the light sources 10a, 10b, and 10c according to a judgment result of whether a predetermined condition is met or not met. The light sources 10a, 10b, and 10c illuminate an interior of a room.

An illumination comparing device 12x is provided with an illumination sampling portion 122x, which includes a sensor that detects illumination in a desired position X, an illumination information storage portion 125x, which stores illumination information Lxs indicating a target illumination, and a comparison result transmitter portion 124x, and uses the comparison result transmitter portion to send a comparison result Cx of a comparison between a sampled illumination Lx and the target illumination Lxs to the transmitter-receiver portions 111a, 111b, and 111c.

An illumination comparing device 12y is provided with an illumination sampling portion 122y, which includes a sensor that detects illumination in a predetermined position Y, an illumination information storage portion 125y, which stores illumination information Lxy indicating a target illumination, and a comparison result transmitter portion 124y, and uses the comparison result transmitter portion to send a comparison result Cy of a comparison between a sampled illumination Ly and the target illumination Lys to the transmitter-receiver portions 111a, 111b, and 111c.

After one of the lighting devices 11a, 11b, and 11c has undergone light variation control by having its light intensity changed by a predetermined amount of light variation, the judgment control device carries out judgment on a comparison result received at the transmitter-receiver portion of the aforementioned one lighting device, a result of which is that the sampled illumination of the illumination sampling portion is brought closer to the target illumination by transferring light variation control of the light intensity of the light sources of the other lighting devices when a predetermined condition is met.

Here, when the lighting control system is provided with a plurality of illumination comparing devices as shown in FIG. 1, the predetermined condition is considered met when there is a judgment result that the sampled illumination measured by the illumination sampling portions and the target illuminations are in a constant relation with respect to all the illumination comparing devices, and the predetermined condition is considered unmet when even one is not in a constant relation. The aforementioned "in a constant relation" refers to when the sampled illumination of the aforementioned illumination sampling portion is larger than the target illumination indicated by the corresponding illumination information. It should be noted that "in a constant relation" may also refer to when the sampled illumination of the aforementioned illumination sampling portion is smaller than the target illumination indicated by the corresponding illumination information.

It should also be noted that even when there is a single illumination comparing device, the definition of "in a constant relation" is defined in the same manner as above.

Furthermore, the predetermined amount of light variation is an amount of light variation based on a difference between an initial light intensity and a threshold light intensity of the light source. The threshold light intensity is set as the light intensity when the predetermined condition becomes unmet, or immediately prior to the predetermined condition becoming unmet while the light intensity of the lighting device changes from the initial light intensity.

The transmitter-receiver portions 111a, 111b, and 111c have a transmission function and carry out declarations of light reduction processing and notices of completion of light reduction processing, which will be described later, to the transmitter-receiver portions of the other lighting devices.

Figure 2:
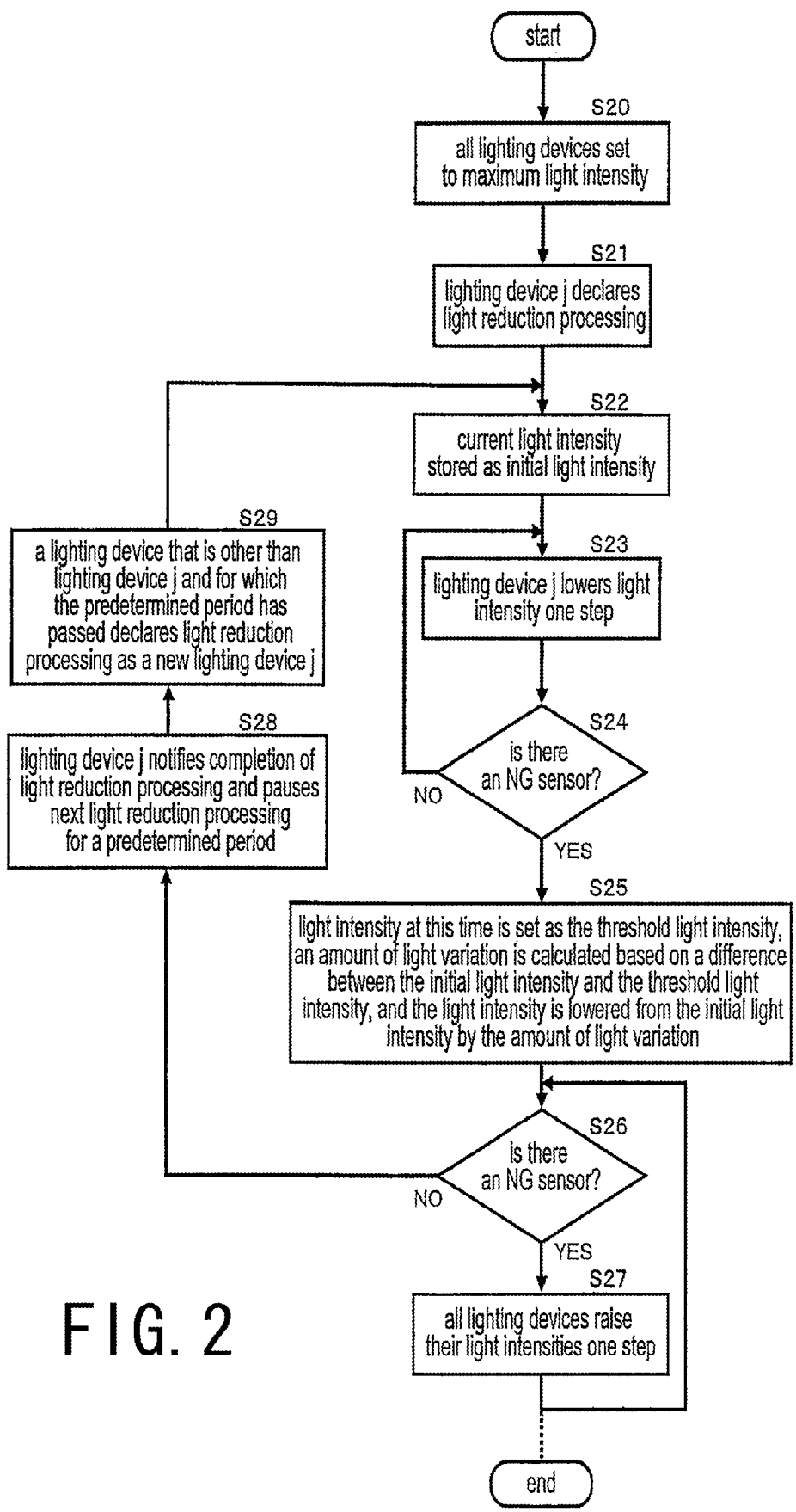
FIG. 2 is a flowchart of one embodiment of a lighting control procedure of a lighting control system according to the present invention.

FIG. 2 shows an example of a flowchart of lighting control according to the present embodiment. At S20 in FIG. 2, the light intensities of the all the lighting devices 11a, 11b, and 11c are set to a maximum light intensity. At S21, the lighting devices 11a, 11b, and 11c carry out negotiation, which will be described later, and a lighting device j declares light reduction processing to the other lighting devices, this being a process of light variation control in the present embodiment. Having received the declaration, the other lighting devices standby without carrying out light reduction processing. At S22, the lighting device j stores the current light intensity as the initial light intensity. At S23, the lighting device j lowers the light intensity one step. One step is set to a predetermined light intensity that is not too large. At S24, a judgment is carried out as to whether or not there is an NG sensor. That is to say, the comparison transmitter portions 124x and 124y examine (Lx−Lxs) and (Ly−Lys) respectively and transmit comparison results Cx and Cy, which indicate whether a value is positive or negative, to the lighting device j. Having received Cx and Cy, the judgment control portion of the lighting device determines whether or not even one of these is negative, that is, whether or not one is NG. If there is no NG, the procedure returns to S22 and the light intensity is again lowered one step. When an NG sensor does occur and there is a YES at S23, the procedure proceeds to S25.

At S25, the light intensity of the lighting device j at this time is set as the threshold light intensity, an amount of light variation is calculated based on a difference between the initial light intensity and the threshold light intensity, and the light intensity is lowered from the current light intensity by the amount of light variation. The value for the amount of light variation is set to one N-th of the difference between the initial light intensity and the threshold light intensity, an example of N being the number of lighting devices. It should be noted that N may be another numerical value. Next, at S26, the same determination as at S24 is carried out. Generally the result of the determination here is NO, that is, in the aforementioned constant relation, thereby meeting the predetermined condition, and therefore the procedure proceeds to S28. At S28, the lighting device j notifies the completion of light reduction processing and the next light reduction processing is paused for a predetermined period. This is so that the other lighting devices can perform light reduction processing.

At S29, the lighting devices except for the above-mentioned lighting device j receive notification of completion of light reduction processing and through negotiation, which will be described later, one of the lighting devices other than the lighting device j acquires a right of light reduction processing as a new lighting device j. A lighting device capable of carrying out negotiation is one that has finished the predetermined period of pause in light reduction processing. At S22, the new lighting device j stores the light intensity at that time as the initial light intensity. Then, the procedure proceeds through S23, S24, S25, and S26.

When not in the aforementioned constant relation and the predetermined condition is not met, return control is carried out in which the light intensities of all the lighting devices are changed by a predetermined amount in a reverse direction to the predetermined amount of light variation to meet the aforementioned predetermined condition. Namely, when Lx and Ly approach Lxs and Lys respectively at S26, one of the sampled illuminations falls below the corresponding target illumination such that a YES occurs. When this happens, all the light intensities of all the lighting devices are raised one step at S27. This one step of light intensity may be the latest amount of light variation of each of the lighting devices or may be a fraction of that number. Alternatively, it may be a sufficiently small predetermined light intensity.

The above-described procedure of S22 to S27 is executed in an order decided by negotiation among the respective judgment control portions 112a, 112b, and 112c to carry out control of light intensities.

Next, negotiation of communications and processing among the lighting devices and among the illumination comparing devices is described. The lighting apparatuses carry out declarations of light variation control, in this case declarations of light reduction processing, using a first-come-first-served system. In order to do this, when a lighting device receives a notification of completion of processing from another lighting device, it transmits a processing declaration after a delay time Td from reception, after which the right of processing of that lighting apparatus is established if a processing declaration is not received from another lighting device within a predetermined window time Tw and light reduction processing commences. The delay time Td is decided using a random number inside each of the lighting devices. When a lighting apparatus that has a large delay time Td and has not yet carried out a processing declaration receives a declaration from another lighting device before carrying out its processing declaration, it will not transmit a processing declaration until the next notification of completed processing is received. It is rare for the value of the delay time Td to be the same in two or more lighting apparatuses. That is, it is extremely rare for a plurality of lighting devices to carry out processing declarations at the same time and ordinarily only one lighting apparatus acquires the right of processing.

In extremely rare cases, a plurality of lighting devices may carry out declarations substantially simultaneously and receive a declaration of light reduction processing from a different lighting device other than itself within the time Tw. In this case, a judgment is made that there is a different lighting device carrying out a light reduction declaration and after a delay time Td' decided by again generating a random number, a light reduction processing declaration is again transmitted. It is even rarer for the delay time Td' to again be the same value in a plurality of lighting devices and finally only one lighting device is able to acquire the right of light reduction processing. Even in the remote possibility that light reduction processing declarations again occur simultaneously, if the declarations are repeated, definitely only one lighting device will be able to acquire the right of light reduction processing. In this process, a lighting device that receives a light reduction processing declaration prior to carrying out a light reduction processing declaration does not acquire the right of light reduction processing and goes into a standby state until the next notification of completion of light reduction processing is received.

The window time Tw can be set longer than a total time required for transmission processing, reception processing, and detection of reception processing of the light reduction processing declaration. The delay times Td and Td' can be set to a time of a random integral multiple of a unit delay time (Tw+δT) longer than the window time Tw.

The aforementioned light reduction processing declaration works to prohibit light reduction processing in the other lighting devices. As another method, a light reduction prohibition telegram may be transmitted after a predetermined time Tf from transmission of the light reduction processing declaration such that a lighting device that receives the light reduction prohibition telegram does not carry out light reduction processing. Tf is set to a value sufficiently smaller than (Tw+δT).

It should be noted that by arranging a lighting device k, which had the smallest delay time Td, to transmit its light reduction processing declaration then transmit a light reduction prohibition telegram after receiving one light reduction processing declaration from another lighting device, the number of lighting devices that carry out light reduction processing declarations prior to receiving the light reduction prohibition telegram becomes two including the lighting device k, and therefore it is possible to have two lighting devices commence light reduction control. When the lighting device k receives two or more light reduction processing declarations simultaneously after it has transmitted its light reduction processing declaration, if it transmits a light reduction prohibition telegram and a telegram to restart light reduction processing declarations, and the aforementioned two or more lighting devices that have already transmitted light reduction processing declarations carries out again light reduction processing declarations, so that the number can be reduced to one. Using the same principle, the number of lighting devices that carry out light reduction control can be set to a desired number of three or more devices.

Furthermore, the following is also possible. Namely, it is possible to provide a loop counter memory in each lighting device and to increase by one the number of times of loops stored in the loop counter memory each time the process of S28 is executed such that along with light reduction processing declarations, loop count data is sent during the aforementioned negotiation. By arranging so that a lighting device that has received a light reduction processing declaration from another lighting device does not carry out a light reduction processing declaration when its number of times of loops is higher, it is possible to make the acquisition of the right for light reduction processing to occur giving priority to lighting devices having lower number of times of loops. It is possible to avoid having only a portion of the lighting device carry out light reduction processing numerous times.

Instead of deciding the delay time Td using random numbers, the number of lighting devices to carry out a light reduction processing declaration may be reduced to one by setting in each lighting device a probability P less than one that a light reduction processing declaration can be carried out. Each lighting device generates a random number and carries out a light reduction declaration only when the number is in a certain range. When light reduction processing declarations overlap within the window time Tw, those lighting devices again generate a random number and carry out a light reduction declaration only when the number is in a certain range. In this way, finally there is one lighting device. It should be noted that it is also possible to make the probability P approach one in accordance to increases in the number of times of loops.

In regard to the aforementioned return control, the return control can be commenced when the telegram of the comparison result sent by the illumination comparing devices is received by the transmitter-receiver portions of the lighting devices and the judgment control portion thereof judges that the predetermined condition is not met. Since the telegrams of the comparison results sent by the illumination comparing devices are received at the same time by all the lighting devices, the return control is carried out together by all the lighting devices including lighting devices that have carried out light reduction processing.

By carrying out negotiation using the same principle as described above between the lighting devices that have not carried out light reduction processing, it is also possible to select the lighting devices to carry out return control. And it is also possible to use negotiation to decide the lighting devices that will not carry out return control.

These communications may be broadcast-type communications that do not require an address for the lighting device. The comparison results are transmitted from the illumination comparing devices 12x and 12y to all the lighting devices, but this too may be broadcast-type communications. The transmitter-receiver portions of the lighting devices receive transmitted information from all the illumination comparing devices. Accordingly, there are no destination addresses and the mode of communications telegram can be simplified.

With such a communication system, lighting control can be carried out so that there is predetermined illumination in a predetermined position without adjusting the lighting devices or the illumination comparing devices even when the number of lighting devices increases or decreases and even when the number of illumination comparing devices increases or decreases. It is also possible to freely move the illumination comparing devices to a desired position and then make the illumination of that position constrict or converge to a desired value.

It should be noted that by separately providing a management device that manages all the lighting devices, it is possible to achieve a configuration in which the execution of light reduction processing is instructed and the lighting devices are made to conduct light reduction processing in order. In this case, the management device and the transmitter-receiver portions of the lighting devices may be connected using wired communication routes or may be connected using wireless channels such as a wireless LAN. By providing plug and play functionality, even when there is an addition to the number of lighting devices, lighting control can be carried out in a state in which a new lighting device has been added.

It is possible that Immediately after starting, the lighting devices communicate with each other simultaneously or alternately and are allotted numbers respectively so as to not overlap, then after the allotment of numbers has finished, light reduction processing is carried out in the order of the numbers such that in the event of a notification of light reduction processing, each device notifies its own number and the lighting device of the next number thereafter is set to acquire the right to carry out the next light reduction processing.

It should be noted that in the foregoing embodiment, description was given concerning light reduction processing in which the light intensity is reduced as a form of light variation control, but lighting control according to the present invention can also be carried out by switching to light increasing processing in which the light intensities are increased starting from the lowest light intensity.

Embodiment 2

Figure 3:
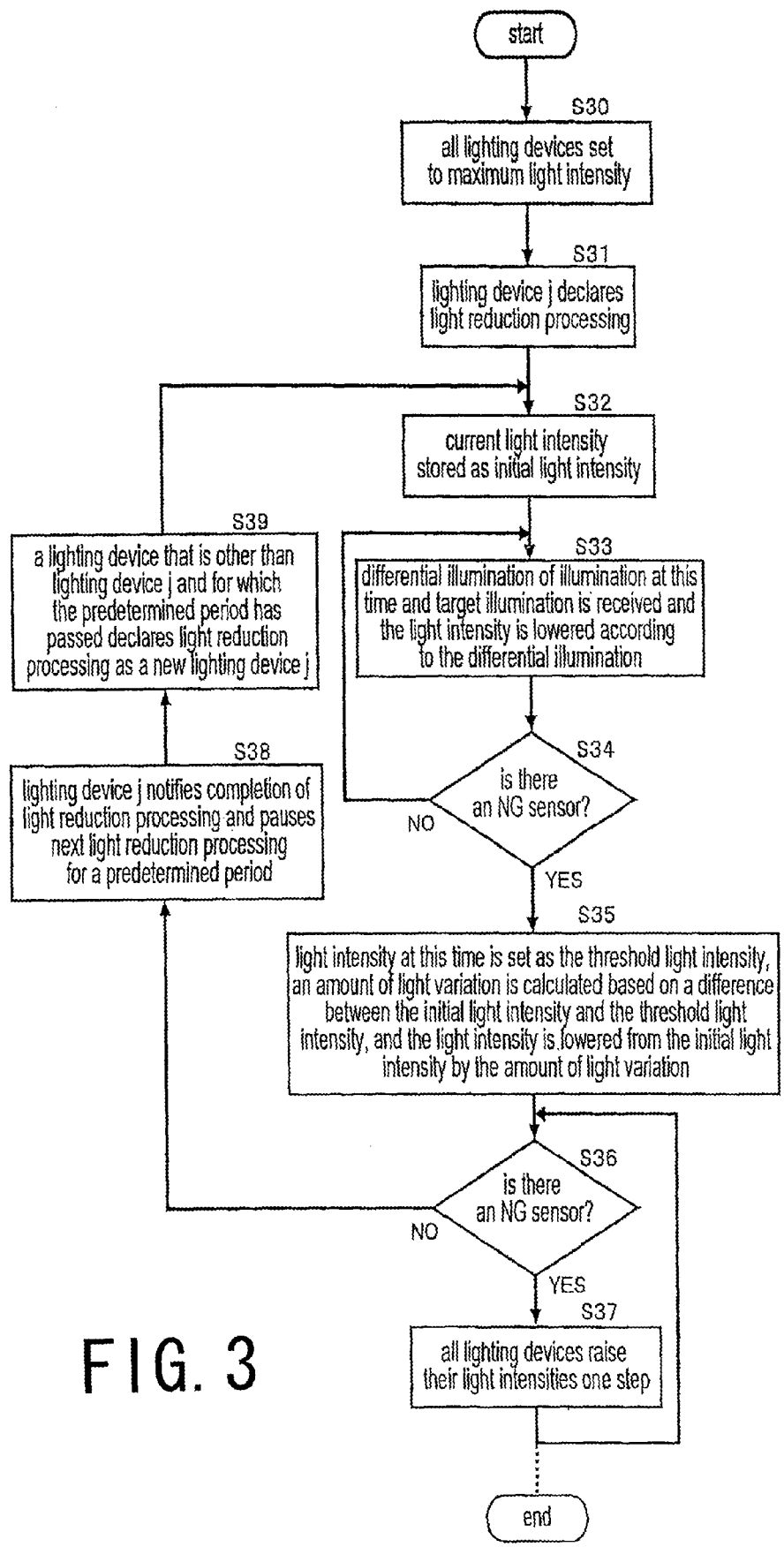
FIG. 3 is a flowchart of one embodiment of a lighting control procedure of a lighting control system according to the present invention.

When obtaining the aforementioned threshold light intensity, one step of light intensity may be decided based on a differential illumination of the current illumination of the illumination comparing device and the corresponding target illumination. FIG. 3 shows a processing flowchart for the case of the present embodiment. Only portions different from the case of FIG. 2 are described.

At S33 in FIG. 3, the lighting device j receives the differential illuminations (Lx−Lxs) and (Ly−Lys) of the sampled illumination in each of the illumination comparing devices at this time and the target illuminations, and lowers its light intensity according to the differential illuminations. For example, the light intensity is lowered for each light intensity not too large in proportion to (Lx−Lxs)+(Ly−Lys).

Here the other steps S30 to S32 and S34 to S39 are respectively the same procedure as S20 to S22 and S24 to S29, and therefore description will be omitted.

In this way, the threshold light intensity can be approached rapidly without spending time even in the case of too-bright lighting devices, and an accurate threshold light intensity can be obtained. After the threshold light intensity is obtained, it is possible to approach the target illumination distribution using the procedure of embodiment 1.

Embodiment 3

Figure 4:
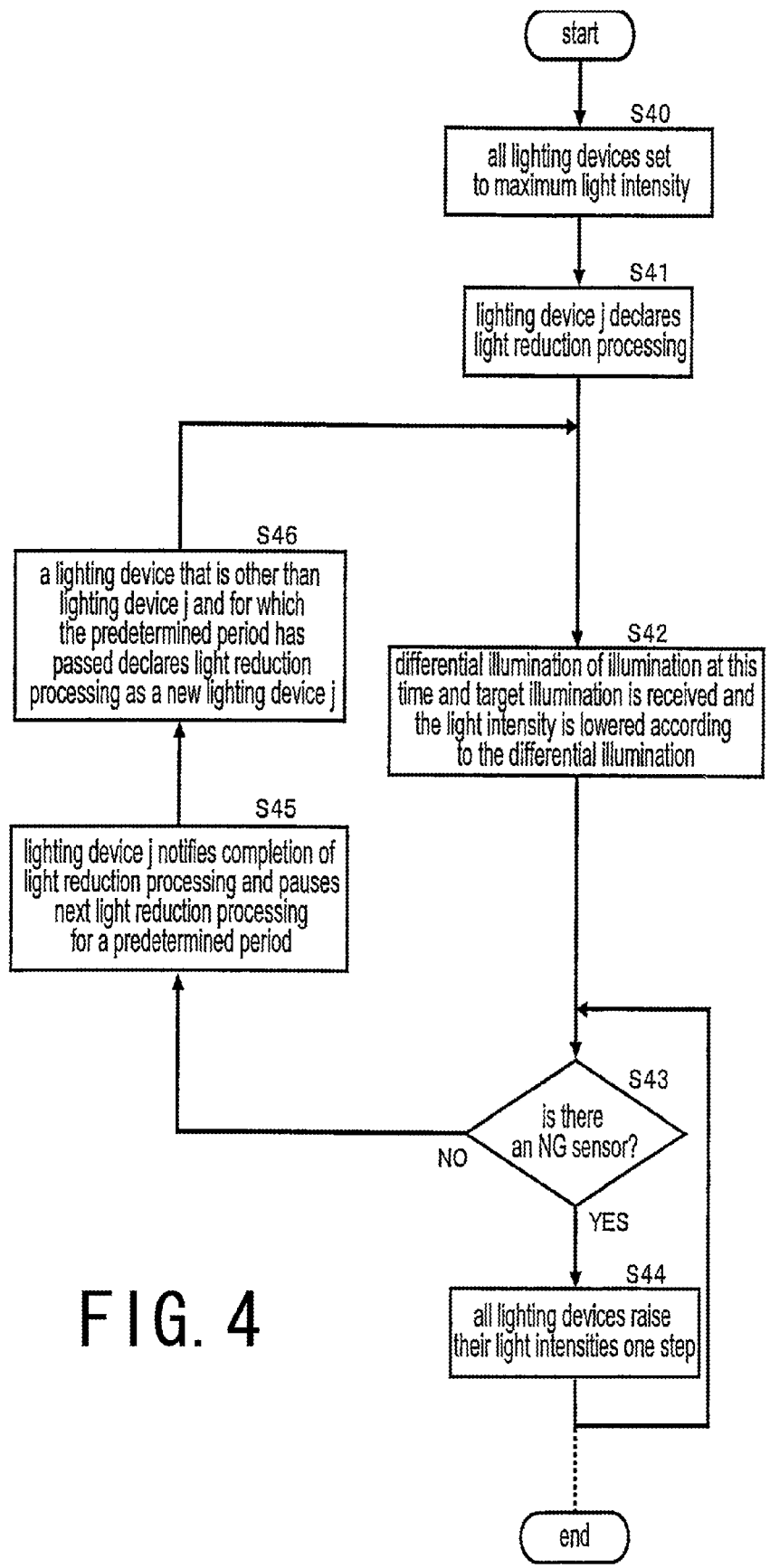
FIG. 4 is a flowchart of one embodiment of a lighting control procedure of a lighting control system according to the present invention.

The aforementioned predetermined amount of light variation may be an amount of light variation based on a differential illumination of a current sampled illumination in the illumination comparing device and the target illumination indicated by corresponding illumination information. FIG. 4 shows a processing flowchart for the case of the present embodiment. Only portions different from the case of FIG. 2 are described.

At S42 in FIG. 4, the lighting device j receives the differential illuminations (Lx−Lxs) and (Ly−Lys) of the illumination in each of the illumination comparing devices at this time and the target illuminations, and sets the amount of light variation according to the differential illuminations. For example, the light intensity is lowered using a light intensity not too large in proportion to (Lx−Lxs)+(Ly−Lys) as a predetermined amount of light variation.

Here the other steps S40 to S41 and S43 to S46 are respectively the same procedure as S20 to S21 and S26 to S29, and therefore description will be omitted.

In this way, even in the case of too-bright lighting devices, a large amount of light variation is applied at first so that an appropriate light intensity can be approached without spending too much time, and since the amount of light variation can be made smaller in accordance with the approach to the final light intensity, the target illumination can be reached rapidly and accurately. Furthermore, the loop procedure for obtaining the amount of light variation in FIGS. 2 and 3 becomes unnecessary, and therefore it is possible to reduce a condition in which the light intensities of the light sources undergo large increase/decrease changes at the initial stage of lighting control.

Embodiment 4

In the foregoing embodiments, when the aforementioned predetermined condition was not met, the light intensities of all the lighting devices were changed by a predetermined amount in the reverse direction to the predetermined amount of light variation in order to meet the aforementioned predetermined condition, after which the process was shifted to light variation control of the light intensities of the other light sources. However, with the present embodiment, it is also possible to make the illumination of the illumination sampling portion approach the target illumination by changing the light intensities of a portion of the lighting devices including the lighting device j, which is carrying out light reduction processing, by a predetermined amount in the reverse direction to the predetermined amount of light variation in order to meet the aforementioned predetermined condition, and then the process is shifted to light variation control of the light intensities of the other light sources.

The above-described embodiments 1 to 4 are methods in which, in an autonomous distributed environment, the light sources independently increase or decrease their light intensities to find out a sensor value of that time, and by doing this a one-step value is found out by inferring the degrees of influence of the light sources (called the "DORAR method"), and are systems in which, based on this, the light sources are made bright at first and are gradually darkened such that once a sensor in even one location violates a constraint condition (the illumination becomes smaller than a prescribed value), the light intensities of all the light sources are increased by a constant value, after which they are again gradually darkened.

Embodiment 5

Next, a lighting control system using a genetic algorithm is described. With this system, the light sources of the lighting devices are randomly made brighter and darker to examine a correlation for a particular light source between its own light intensity and information of a sensor, and its own influence is inferred by learning such that an appropriate one-step value can be found out from the inferred result and the light intensity controlled.

With the present embodiment, as with that shown in FIG. 1, the lighting control system is provided with two or more lighting devices and one or more illumination comparing devices. The lighting devices are provided with a transmitter-receiver portion, a judgment control portion, and a light source, and the comparison result sent by the illumination comparing device is received and undergoes a predetermined judgment to control the light intensities of the aforementioned light sources. The aforementioned illumination comparing device is provided with an illumination sampling portion that samples illumination, illumination information, which is information indicating a target illumination, and a comparison result transmitter portion. The comparison result of comparing the sampled illumination and the illumination information is transmitted by the comparison result transmitter portion.

The light intensity of at least one of the lighting devices is randomly changed, and the sampled illumination of the illumination sampling portion is made to approach the target illumination by generally narrowing the range of light intensity that is randomly changed based on the comparison results received at the judgment control portion.

Although the light intensities of the lighting devices may be changed randomly one by one, it is possible to achieve a target illumination distribution in a shorter time by randomly changing the light intensities of all the respective lighting devices independently and making the illumination of the illumination sampling portion approach the target illumination by generally narrowing the range of light intensity that is randomly changed based on the comparison results received at the judgment control portion. Here "generally" means that although it is possible for the range of light intensity to temporarily expand locally, broadly the range can continue to be narrowed.

Furthermore, it is also possible that the illumination comparing device compares the sampled illumination and the illumination information and transmits illumination difference information as a comparison result so that the received comparison result is evaluated in the judgment control portion of the aforementioned at least one lighting device, and narrows the range in which the light intensity is randomly changed so as to increase the occurrence rate of light intensities corresponding to evaluations of small illumination differences and make the illumination of the illumination sampling portion approach the target illumination.

When the judgment control portion of the lighting device is provided with a plurality of illumination comparing devices, the comparison results received from the plurality of illumination comparing devices are totaled to calculate an evaluation value and the illumination of the illumination sampling portion is made to approach the target illumination by generally narrowing the range of light intensity that is randomly changed based on the evaluation value.

FIG. 5 shows examples of evaluation values of illumination differences when the light intensity of the lighting device j is changed randomly. First, a case in which there is a single illumination comparing device is described. The light intensity of the lighting device j is randomly changed among a plurality of values between a maximum value and a minimum value, in units of 10% for example, and evaluation values for the respective light intensities are calculated. This is a single random sequence. When the light intensity is 200 candelas, the evaluation value of the difference with the target illumination is −37. The evaluation values are numerical values in which the illumination difference with the target illumination is converted by a predetermined formula. Next, a value of 48 is given for 1,000 candela. When the light intensities of the other lighting devices are also changed randomly, the evaluation values will not always be the same even when the light intensity of the lighting device j is the same. However, the extent of influence on illumination by the light intensity of the lighting device j is evident in a table of light intensities of the lighting device j and a table of evaluation values of the illumination differences. Of the evaluation values according to the random sequence this time, portions of light intensities corresponding to large positive numerical values and large negative numerical values are excluded to narrow the range of variation of light intensities, and in the next random sequence, the light intensity of the lighting device j is again randomly changed and evaluation values are calculated. For example, from the larger positive evaluation values, 1,000 candela and 900 candela, which correspond to 48 and 43, are excluded, and from the larger negative values, 100 candela and 200 candela, which correspond to −35 and −37, are excluded, and the light intensity is changed randomly in the range of 300 candela to 800 candela. The unit width of change was 100 candelas the previous time, but this time it can be made smaller to 80 candelas. By narrowing the width of random change for each random sequence, the light intensity of the lighting device j can be made to approach a light intensity that gives an illumination close to the target illumination.

When a plurality of illumination comparing devices are provided, the judgment control portion of each lighting device totals the plurality of comparison results received from the plurality of illumination comparing devices and calculates evaluation values. A method of totaling may be simply adding the numerical values of the plurality of comparison results, or may be an average. The numerical values of the plurality of comparison results may be subjected to root square addition or root mean square. In this case, the evaluation values are positive values not smaller than zero, and therefore the light intensity variation width is narrowed by excluding light intensities that have caused regions of large evaluation values.

As another method, the illumination comparing device may transmit large-small information representing which of the sampled illumination and the illumination information is larger, and the judgment control portion of the at least one lighting device establishes a new, slightly narrower range of light intensity change in which large information and small information of the large-small information is generally counterbalanced based on the received comparison results and random change occurs within that range. Then, by proceeding in order with the above-described processing, the range of light intensities is narrowed and the illumination of the illumination sampling portion may be made to approach the target illumination. The comparison results in this case can be viewed as items expressed as binaries.

The occurrence rate of randomly changed light intensities may be a uniform distribution, but may also be an occurrence rate of intermediate light intensities made larger such as in a normal distribution. In the above description, the light variation width of light intensities was set to narrow, but this may also be set such that the occurrence rate of light intensities in the large region and in the small region is made smaller, that is, it may be made narrower statistically.

The method of calculating the evaluation values and the methods for selecting the variation width of light intensities and variation regions may be methods other than those in the above-described examples.

Embodiment 6

Figure 6:
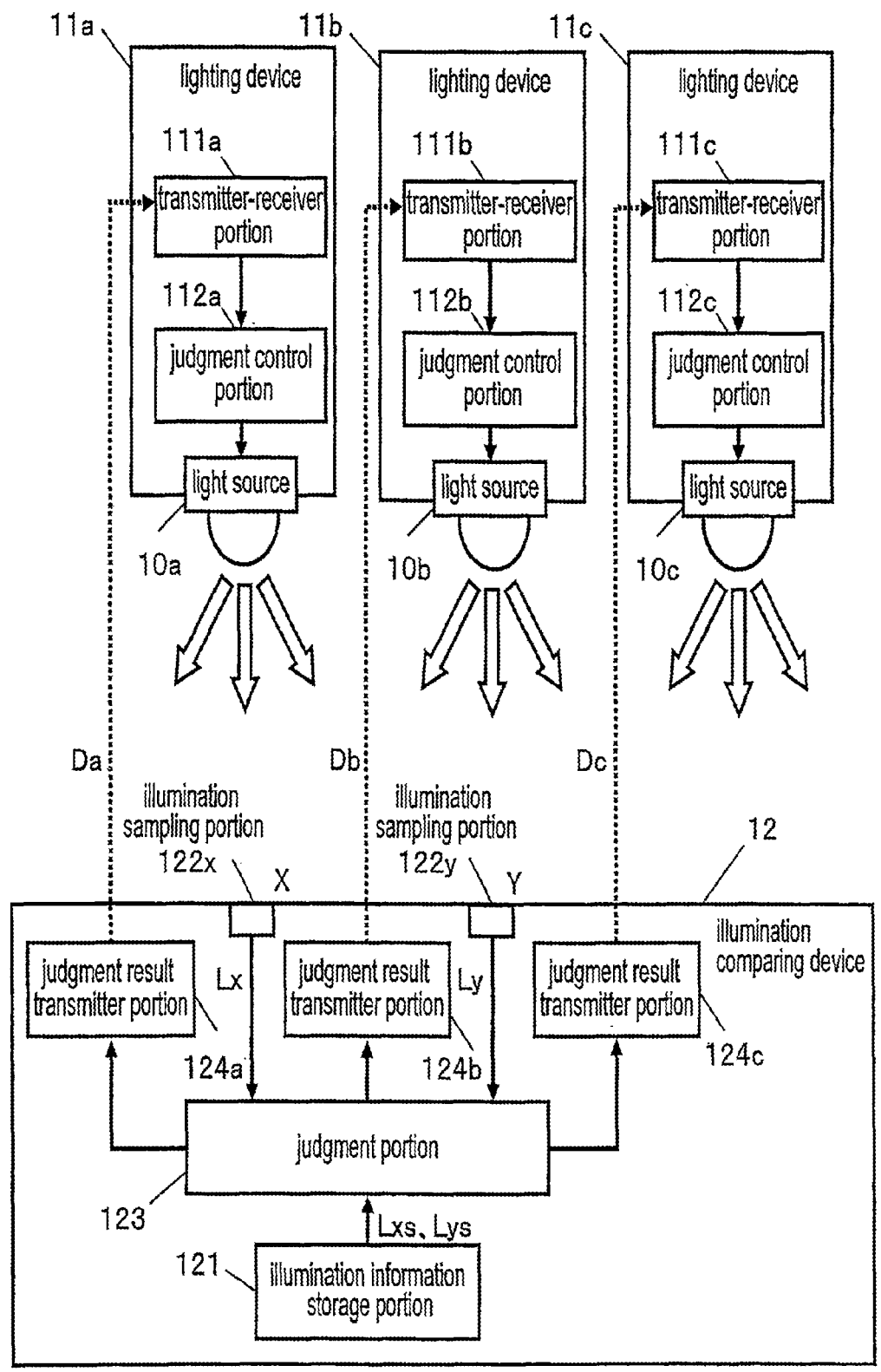
FIG. 6 is a block diagram of one embodiment of a lighting control system according to the present invention.

FIG. 6 is a block diagram showing a lighting control system according to the present invention. In FIG. 6, description concerns controlling illumination of predetermined locations based on three light sources, light sources 10a, 10b, and 10c.

In FIG. 6, a lighting device 11a has a transmitter-receiver portion 111a, a judgment control portion 112a, and the light source 10a. A lighting device 11b has a transmitter-receiver portion 111b, a judgment control portion 112b, and the light source 10b. A lighting device 11c has a transmitter-receiver portion 111c, a judgment control portion 112c, and the light source 10c. The light sources 10a, 10b, and 10c are respectively connected to the judgment control portions 112a, 112b, and 112c, and the light intensities of the light sources 10a, 10b, and 10c are respectively controlled. The light sources 10a, 10b, and 10c illuminate an interior of a room.

The illumination comparing device 121 has the illumination sampling portions 122x and 122y that include sensors for detecting the illumination of a predetermined position X and position Y, an illumination information storage portion 121, and judgment result transmitter portions 124a, 124b, and 124c. The illumination information storage portion 121 stores illumination information indicating target illuminations corresponding to the positions X and Y. The illumination information is given as Lxs and Lys. A judgment portion 123 examines the target illuminations Lxs and Lys corresponding to the sampled illumination Lx of the position X detected by the illumination sampling portion 122x and the sampled illumination Ly of the position X detected by the illumination sampling portion 122y and judges whether or not Lxs and Lx and Lys and Ly meet the predetermined condition, that is, whether or not these are in a constant relation. In accordance with the judgment result, the illumination comparing device 12 transmits judgment result information Da, Db, and Dc through the judgment result transmitter portions 124a, 124b, and 124c respectively.

The transmitter-receiver portion 111a receives the judgment result information Da and sends it to the judgment control portion 112a. In accordance with the judgment result information Da, the judgment control portion 112a maintains, increases, or decreases the light intensity of the light source 10a. The transmitter-receiver portion 111b receives the judgment result information Db and sends it to the judgment control portion 112b. In accordance with the judgment result information Db, the judgment control portion 112b maintains, increases, or decreases the light intensity of the light source 10b. The transmitter-receiver portion 111c receives the judgment result information Dc and sends it to the judgment control portion 112c. In accordance with the judgment result information Dc, the judgment control portion 112c maintains, increases, or decreases the light intensity of the light source 10c.

When there is a single illumination sampling portion in the lighting control system of the present invention, the aforementioned judgment control portion carries out a predetermined judgment and judges that the predetermined condition is met when the aforementioned sampled illumination is in a constant relation with the aforementioned target illumination and judges that the predetermined condition is unmet when the aforementioned sampled illumination is not in a constant relation with the aforementioned target illumination. When there are two or more illumination sampling portions as shown in FIG. 6, the judgment control portions 112a, 112b, and 112c judge as a predetermined judgment that the predetermined condition is met when all of the sampled illuminations Lx and Ly are in a constant relation with the corresponding target illuminations Lxs and Lys, and judge that the predetermined condition is unmet when even one of these is not in a constant relation.

In regard to "in a constant relation" above, this state is called "OK" when the sampled illuminations of the positions are larger than the target illumination indicated by illumination information of those positions, and in particular is deemed "in a constant relation" when all the positions are "OK," and deemed "not in a constant relation" when even one position is not "OK." In the case of FIG. 6, "OK" is when the sampled illuminations Lx and Ly are respectively larger than the corresponding target illuminations Lxs and Lys, and in this case the aforementioned predetermined amount of light variation is set as an amount of light reduction.

Figure 8:
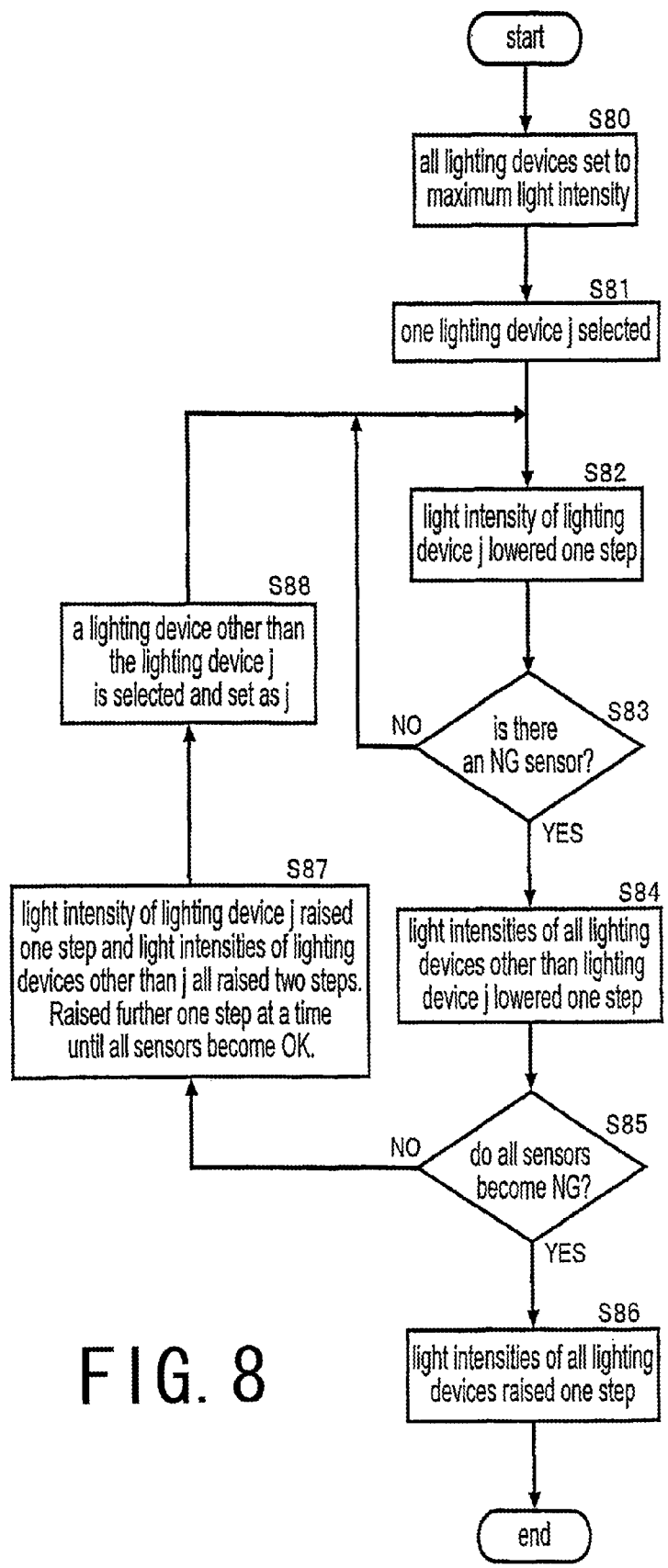
FIG. 8 is a flowchart of one embodiment of a lighting control procedure of a lighting control system according to the present invention.

Next, a procedure for regulating to a desired illumination is described using the flowchart shown in FIG. 8. Before starting, one step of light reduction, which is a predetermined amount of light variation of the light sources, is obtained. First, all the light sources are set to a maximum light intensity. Then, one light source is selected and set as a light source j. The light source j carries out light reduction until one sensor, that is, one illumination sampling portion becomes "NG." Here, "NG" is when the detected illuminations Lx and Ly of the sensors fall below the illumination information Lxs and Lys set in each sensor. "OK" is when these exceed the illumination information. Furthermore, the initial light intensity of the light source j is called the "current light intensity" and the light intensity after light reduction is called the "threshold light intensity," and when the difference thereof is given as a "width of light intensity difference," the next light intensity is expressed as "next light intensity"="current light intensity"−"width of light intensity difference"/N (N is usually set to approximately 4 to 8, but there is not limitation to this). One step is set as "width of light intensity difference"/N="amount of light variation." Accordingly, in a single time of light reduction processing, the light intensity of the light source j is not reduced to the threshold light intensity at which a given sensor becomes "NG," but is reduced to a light intensity considerably brighter than that. In other words, one step of light reduction is set to a sufficiently small step. When there is no illumination sampling portion that becomes "NG" even when the light intensity of the light source j is set to the minimum, that minimum light intensity is employed as the threshold light intensity. With this procedure, an amount of light variation that is one step of light reduction for each lighting device is obtained and stored in each judgment control portion for light variation control. In Light variation control hereafter, in the light reduction processing hereinafter in the case of the present embodiment, light reduction is carried out in accordance with this step.

FIG. 8 is a flowchart showing lighting control according to the present embodiment. In the flowchart of FIG. 8, at first all the light sources are set to a maximum light intensity (S80). Then, one lighting device is selected and set as the lighting device j (S81). The lighting device j carries out light variation control, that is, carries out light reduction (S82 and S83) in the present embodiment until one sensor, that is, one illumination sampling portion becomes "NG." Here, "NG" is when the detected illuminations Lx and Ly of the sensors fall below the illumination information Lxs and Lys set in each sensor. "OK" is when these exceed the illumination information.

When there is a "YES" at S83, the light intensities of the light sources other than the lighting device j is lowered one step. At S85, a determination is made as to whether or not the sensors of all the illumination sampling portions have become "NG" and if this is "NO," then at S87 the light intensity of the lighting device j is raised one step and the light intensities of the light sources other than the lighting device j are all raised two steps. These are return control in a direction reverse to the light variation direction of light reduction processing. Furthermore, the sensors of all the illumination sampling portions becoming "NG" corresponds to all the sampled illuminations falling below all the corresponding target illuminations, that is to say, an inverse relation to the aforementioned "in a constant relation." In other words, compared to a state in which the predetermined condition is being met, this corresponds to the large-small relation of the aforementioned sampled illuminations and the corresponding target illuminations becoming reverse at the positions of all the illumination sampling portions. When all the sensors do not become "OK," the light intensity is raised a further one step. Then, in S88, a light source other than the lighting device j is selected and set as j. Light variation control (S82) and determination (S83) are executed on the newly selected lighting device j.

When the above steps are repeated and a YES occurs at S85, the illuminations at all the illumination sampling portions approach the illumination information Lxs and Lys, and therefore the light intensities of all the light sources are all raised one step at S86. In this way, the sensors of all the illumination sampling portions can respectively reach a condition closest to a minimal illumination that does not become "NG," that is, a desired illumination. The illuminations at the positions of the illumination sampling portions converge to an illumination within one step of error from the target illumination according to the illumination information.

It should be emphasized that if the maximum light intensity of the light sources 10a, 10b, and 10c is low, then with the above-described procedure, the target illuminations Lxs and Lys may not be able to be regulated at the desired illumination. It should also be emphasized that when the number of light sources is small and the number of illumination sampling portions is large, the illumination at all the positions may not be able to be regulated according to the target illuminations. Furthermore, it should be emphasized that when extremely high illuminations or low illuminations are included in a portion of the illumination information of the target illuminations, it may not be possible to regulate at the desired illumination unless the light source is arranged in an appropriate position. In other words, if it is originally possible to achieve an illumination distribution by regulating the light intensities of the light sources, then a desired illumination distribution is achievable using the above-described procedure. Furthermore, even for larger errors with respect to the target illumination, it is possible to approach the target illumination.

In the above-described embodiment 6, while the lighting devices 11a, 11b, and 11c carry out light reduction control on the light intensities of their respective light sources based on a self-decided step using only "OK" and "NG" information that they have been given, an overall desired illumination distribution is achieved.

It should be noted that when determining the size of one step and when selecting the lighting device j from among the lighting devices, the order may be decided by negotiation among the lighting devices as described in embodiment 1, or instructions may be given by the judgment portion 123 using the judgment result transmitter portions 124a, 124b, and 124c.

The judgment portion 123 is unaware of the light intensity of each of the lighting devices, and therefore judgment of "OK" and "NG" are carried out using only the illumination information. The judgment results are ordinarily achieved in one for one group of illumination information (Lx, Ly, Lxs, and Lys), and therefore only one of the judgment result transmitter portions 124a, 124b, and 124c may be provided such that the judgment results are transmitted to all the lighting devices. The judgment control portion of each lighting device judges how to control the light intensity of the light source according to the received judgment result and information such as the extend of light variation relating to its own light intensity.

Furthermore, instead of the illumination comparing device 12 in FIG. 6, the illumination comparing devices 12x and 12y of FIG. 1 may be provided and the above-described "OK" and "NG" judgments carried out by the illumination comparing device 12 may be carried out inside the judgment control portions 112a, 112b, and 112c of the lighting devices 11a, 11b, and 11c.

Furthermore, when a plurality of illumination comparing devices 12 are provided, the judgment control portions 112a, 112b, and 112c of the lighting devices 11a, 11b, and 11c respectively acquire a plurality of judgment results. From the plurality of acquired judgment results, it is possible to judge whether the relation of all the sampled illuminations of all the illumination sampling portions and the respective corresponding target illuminations are in a constant relation or not in a constant relation. That is, when the plurality of judgment results are all in a constant relation, the entirety thereof is also in a constant relation and when there is even one that is not in a constant relation, the entirety thereof is not in a constant relation as a whole.

In the present embodiment, the size of the amount of light variation may be changed in the process of approaching the target illumination. For example, at S85 in FIG. 8, the extent of light variation of the lighting device j may be made smaller each time there is a "NO." By doing this, the extent of light variation is larger at first, thus it is possible to approach the vicinity of the target illumination rapidly and control over the light intensity can be made more precise during the approach, and therefore it is possible to more accurately constrict and converge the illuminations to the target illumination. To do this, each of the lighting devices can count the number of times of looping at S85.

At the return control of S87 in FIG. 8, the size of the one step and two steps when raising the light intensities may be the latest predetermined amount of light variation held by the respective lighting devices or may be a value smaller than that.

In contrast to embodiment 1 where the light intensities of the lighting devices without exception were gradually lowered, the present embodiment is a system by which the lighting devices are made to rapidly approach until the vicinity of the threshold light intensity at the initial stage, after which correction is performed to approach the target illumination. Although lighting devices that are less than the final light intensity occur during control, return control is carried out at S87 and light intensities that have dropped excessively are rectified.

The following is also possible as a variation on the procedure of the present embodiment. In the flowchart of FIG. 8, S84, S85, and S86 are deleted, and the procedure proceeds to S87 when there is a YES at S83, then at S87 the light intensities of all the lighting devices are raised one step and when all the sensors do not become OK, the light intensities are raised further one step at a time until all sensors become OK. That is, return control is carried out until the aforementioned predetermined condition is met. When doing this, one of the lighting devices is always carrying out light reduction processing even when there is a stable condition. When making the amount of light variation smaller in accordance with the approach to the target illumination, flickering in the illumination due to light reduction processing is made smaller such that it is possible to make it unnoticeable to humans.

In the present embodiment, description was given concerning a case in which light reduction processing is carried out as light variation control, but it is also possible to reach an illumination close to the target illumination with light-increase processing in which light is increased gradually from the direction of small light intensities. In this case, the aforementioned predetermined amount of light variation is set to an amount of light reduction and the return control is set to control in a light-increase direction.

Embodiment 7

Figure 7:
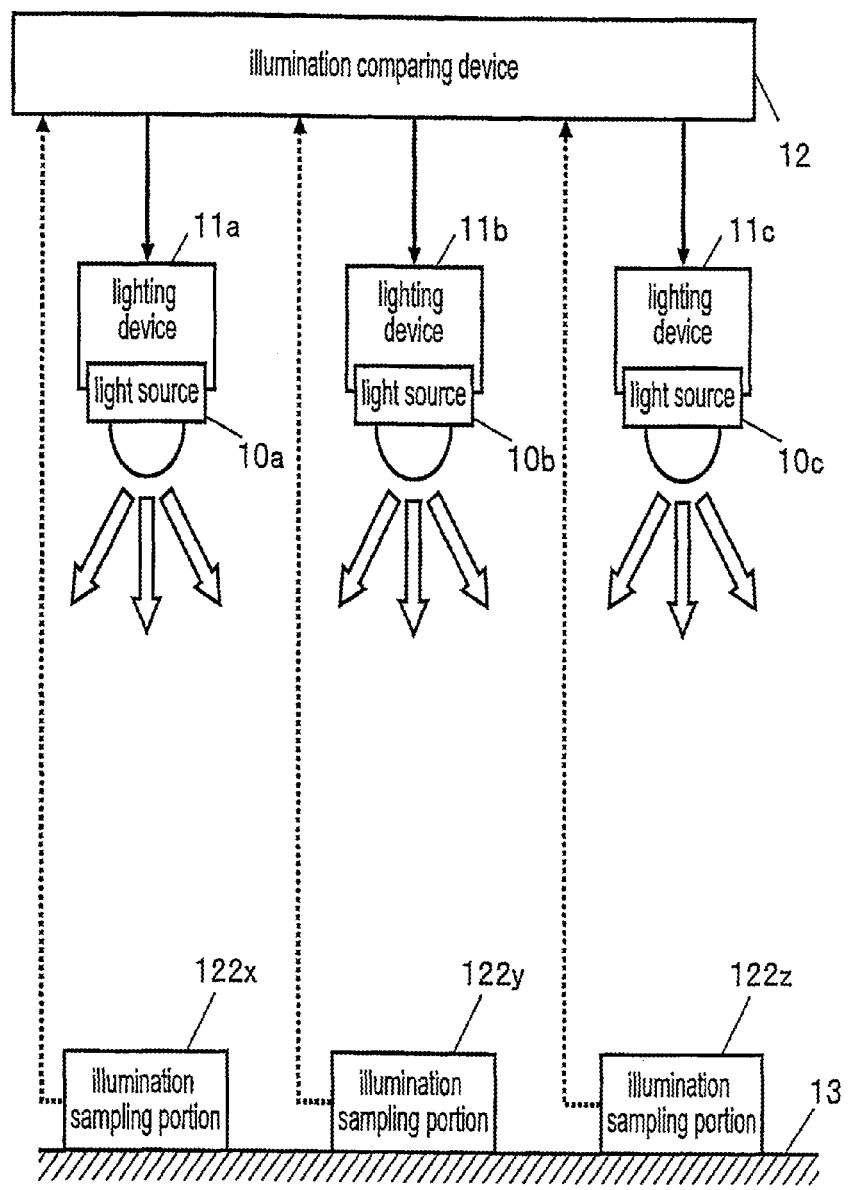
FIG. 7 is a block diagram of one embodiment of a lighting control system according to the present invention.

In the lighting control system in embodiment 7 shown in FIG. 7, the illumination comparing device 12 is provided with three illumination sampling portions 122x, 122y, and 122z. The illumination sampling portions 122x, 122y, and 122z are arranged on a wall surface 13 on which the desired illumination is desired to be set, and the illumination information is sent to the judgment portion 123 inside the illumination comparing device 12, which is in a distant position. For example, this can be applied for illumination of painting artworks at a museum. In this way, it is preferable that the illumination sampling portions 122x, 122y, and 122z are installed at positions where the desired illumination is desired to be set. The illumination sampling portions 122x, 122y, and 122z and the illumination comparing device 12 may be connected by wireless communications.

Embodiment 8

In the control procedure of FIG. 8, when an extremely small illumination is included among the illumination information Lxs, Lys, and so on corresponding to the desired illuminations, even when the light intensity of the lighting device j is progressively lowered in S82 and set to the minimum light intensity that the light source is capable of producing, there may be times when there is no YES at S83 since the light from the other light sources is strong. There may be times when the optimal state of convergence is a state in which the light intensities of light sources other than the lighting device j are set extremely small to set the lighting device j to an appropriate illumination. When the light intensities of the light sources other than that of the lighting device j are still large and the aforementioned predetermined condition remains unchanged even when the lighting device j is set to the minimum illumination it can produce or an illumination one step above that, the NO remains unchanged at S83 such that extrication from the loop cannot be achieved. For this reason, it is not possible to advance to an optimal state of convergence. To prevent such a situation, the control procedure shown in FIG. 9 is used.

Figure 9:
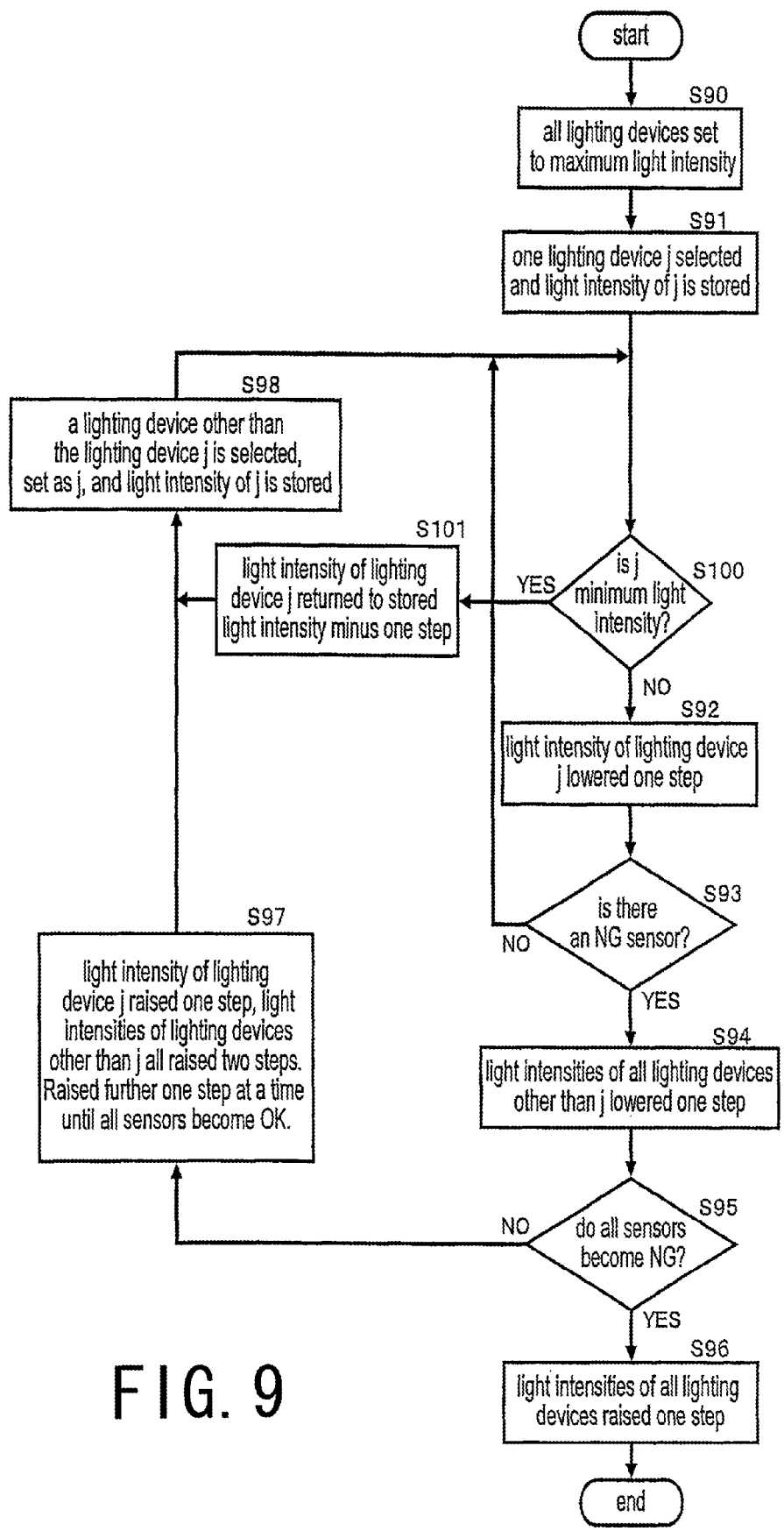
FIG. 9 is a flowchart of one embodiment of a lighting control procedure of a lighting control system according to the present invention.

In the control procedure flowchart in FIG. 9, S81 and S88 of FIG. 8 are changed to S91 and S98 and further steps S100 and S101 are added. At S91, one lighting device j is selected and the setting value of the light intensity of that time is stored. At S100, a determination is made as to whether or not the light intensity of the lighting device j is the minimum light intensity that can be produced. If this is NO, then the light intensity is lowered one step (S92). If this is YES, then the light intensity cannot be lowered any more. Such a condition comes about because the light intensities of the other light sources are too strong, and therefore the light intensity of the lighting device j is returned to a light intensity one step lower than the setting value of the stored light intensity (S101). Next, at S98, another light source is selected, the lighting device thereof is set as j, and the light intensity of the new lighting device j is stored. Then, the procedure of S100 to S93 is executed with descending light intensities on the new lighting device j. By doing this, when a light source having an exceedingly excessive light intensity is reached, the illumination thereof is lowered preferentially, and the light intensities of such light sources having excessive light intensities can be lowered in order, and it is possible to achieve the process of convergence, that is, to proceed through steps 92 to 97 using the principle of the procedure described in FIG. 8.

Embodiment 9

Next, a procedure is described by which the convergence using the control procedures of FIGS. 8 and 9 can be made faster. In the control procedures of FIGS. 8 and 9, in order to make the illumination in each position, that is, in each of the illumination sampling portions sufficiently close to the target illumination, it is necessary to make smaller the width of the amount of light variation of one step. In this case, the illumination of each position is made to approach the target illumination in small increments and convergence cannot be achieved unless the loop in the flowcharts of FIGS. 8 and 9 are repeated a multitude of times.

Accordingly, at the first loop procedure prior to becoming YES initially at S85 and S95 after starting, the amount of light variation of one step is set larger. For example, when the resolving power of light intensity capable of being set for the light sources has 100 gradations between a maximum light intensity Lmax and zero, then initially one step is set to 20 gradations. That is, the unit is 20% of the maximum light intensity. At the stage where S86 and S96 are reached, there is error in the illuminations of the illumination sampling portions roughly of up to 20 gradations with respect to the target illumination. In this condition, the procedure returns to S81 in FIG. 8 or S91 in FIG. 9 and one step is reduced to five gradations so that the loop procedure is executed until there is a YES at S85 and S95. Next, one step is reduced to one gradation and the loop procedure is executed until there is a YES at S85 and S95. With a method such as this in which the precision of control is increased in accordance with the overall approach to the target illumination, convergence can be achieved rapidly.

In embodiment 6, the N that has been described may be set to a large value in accordance with convergence to make the amount of light variation smaller.

Embodiment 10

In the foregoing embodiments 6, 7, 8, and 9, communication between the lighting devices 11a, 11b, and 11c was not absolutely necessary. An embodiment 10, in which cooperation between the lighting devices is implemented, is described using FIG. 10.

Figure 10:
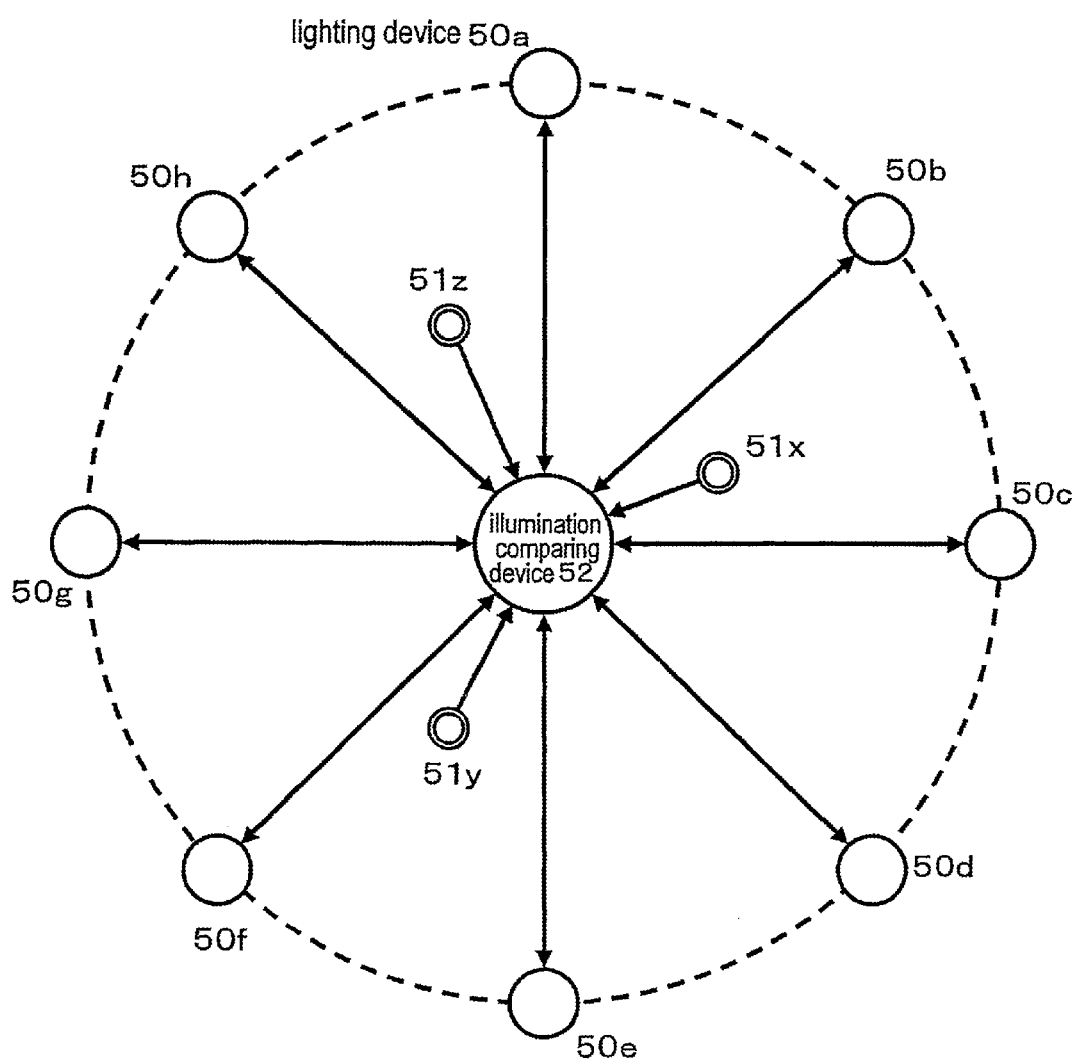
FIG. 10 is a communications path diagram of one embodiment of a lighting control system according to the present invention.

In FIG. 10, lighting devices 50a, 50b, and 50c to 50h are respectively lighting devices such as the lighting device 11a in FIG. 6. The transmitter-receiver portions of the lighting devices are connected by communications paths shown by dashed lines and communications can be carried out between each of the lighting devices. An illumination comparing device 52 receives from three illumination sampling portions 51x, 51y, and 51z and can send information of the comparison results to the lighting devices 50a to 50h.

First, the lighting devices measure one step of light reduction. The lighting device 50a declares that it will conduct measuring of the amount of light variation and transmits a request telegram (the data structure and other details of the request telegram are not a concern here) to the destination addresses of the other lighting devices for the maximum light intensity to be set. Having received the request telegram, the lighting devices return an acknowledgment reply telegram (the data structure and other details of the reply telegram are not a concern here) as long as they are not currently conducting measurement of the amount of light variation, and set to the maximum light intensity. If a lighting device is currently conducting measurement of the amount of light variation, it replies to that effect. If the lighting device 50a does not receive a telegram within a fixed time informing of conducting measurement of the amount of light variation, a judgment is made that measurement of the width of light intensity difference is possible, and the lighting device 50a gradually carries out light reduction from the maximum light intensity, and when an "NG" is received from the illumination comparing device 52, light reduction is stopped and the light intensity of that time is set as the threshold light intensity. (Current light intensity−threshold light intensity), in this case, (maximum light intensity−threshold light intensity) becomes the width of light intensity difference. Width of light intensity difference/N is stored as one step of the amount of light variation. When the lighting device 50a finishes measuring the amount of light variation, it sends a telegram of completion of measuring of the amount of light variation to the other lighting devices. Having received the telegram of completion of measuring of the amount of light variation, the other lighting devices, if they have not finished measuring of the amount of light variation, declare that they will measure the amount of light variation and transmit a request telegram for the maximum light intensity to be set and carry out measurement of the amount of light variation in the same manner. When measurement of the amount of light variation is unfinished, a telegram that measurement of the amount of light variation is unfinished is periodically sent to the other lighting devices. This procedure progresses and when, within a fixed time, there is a state in which there is no telegram that measurement of the amount of light variation is unfinished, a transition is made to light reduction processing to adjust the illumination distribution.

The illumination comparing device 52 inquires to the lighting devices 50a to 50h as to whether or not measurement of the amount of light variation is finished. When there no reply of being unfinished, the illumination comparing device 52 carries out communication with the lighting devices 50a to 50h and issues a telegram inquiring as to whether or not light reduction permission information Dp is held, and when there are a plurality of Dp present, only one lighting device is permitted to hold this information, and when there are no Dp, one lighting device among the lighting devices 50a to 50h is selected and light reduction permission information Dp is sent. A lighting device that possesses Dp can conduct light reduction by one step that it itself is storing. When a fixed time Ts has elapsed after the execution of its own light reduction, the lighting device that possesses Dp randomly selects another lighting device and transmits Dp to pass on Dp. The lighting device that receives Dp acquires the right to conduct light reduction processing and after conducting one step of light reduction processing, passes on Dp to another lighting device. In this way, the lighting devices 50a to 50h randomly proceed to conduct light reduction processing.

On the other hand, the illumination comparing device 52 compares the illuminations of the three positions occupied by the illumination sampling portions 51x, 51y, and 51z and the illumination information, and notifies "NG" to all of the lighting devices 50a to 50h when an "NG" is detected. When they receive the "NG", the lighting devices 50a to 50h increase their light intensities by one step. When an "NG" is again notified after a fixed time T, the lighting devices 50a to 50h again increase their light intensities by one step. In other words, the lighting devices 50a to 50h are made to increase their light intensities until there is no "NG" position.

It should be noted that the lighting device that possesses Dp may wait to execute the Dp, that is, execute light reduction processing, until there is no notification of "NG."

When executing the above-described procedure, no "NG" is produced at first since the light intensities of the lighting devices 50a to 50h are large, but in accordance with the approach to the desired illumination distribution, many "NG"s are produced. Each time an "NG" is produced, in a state where the light intensities of all the lighting devices are returned (light-increasing) by one step, the light intensity of any other lighting-device that still has a possibility of excessive light intensity is progressively or randomly selected and lowered, thereby enabling the desired illumination distribution to be approached as a whole.

The aforementioned fixed time Ts can be set to a time allowing extra time for the light intensity of the light source of the lighting device to become stable and for anticipation of a delay time until "NG" notification and reception from illumination sampling.

Even after sufficiently approaching the illumination distribution, the lighting device that acquires Dp carries out light reduction processing, and therefore an "NG" is produced and the lighting devices repeat light reduction and light-increasing. That is, there is no state of complete stability, but this becomes a state of quasi-stability. If the size of the one step is sufficiently small, the flickering of illumination at the three positions is unnoticeable to humans.

Furthermore, if the pattern in which "NG" and "OK" are produced is in a predetermined range, the light intensities of the lighting devices may be fixed as being stable and deemed a state of complete stability. For example, this may be when "NG" and "OK" become alternating, or when the frequency of occurrences of "NG" and "OK" within a fixed short time becomes substantially equivalent. In such cases, the illumination comparing device 52 transmits a command to the lighting devices 50a to 50h for the light intensities to be fixed. Processing may also be paused by manually sending a "control pause" signal. In this case, control can be restarted by sending a "control restart" signal as required.

Embodiment 11

In the foregoing embodiments, if the light intensity setting values of the light sources and lighting devices converged on the desired illumination distribution are stored, then prior to a performance or the like, the desired illumination distribution can be achieved quickly by reading out the stored setting values and setting the light intensities. Also, by storing the light intensity setting values of the light sources and lighting devices at an arbitrary stage of the convergence process and then reading out the stored setting values and setting the light intensities, the convergence procedure can commence from that stage such that the desired illumination distribution can be reached very rapidly.

Embodiment 12

In the foregoing embodiments, if the light intensity setting values of the light sources and lighting devices in the convergence process toward the desired illumination distribution and the sampled illuminations of the illumination sampling portions are displayed on a display, the status of the convergence operation can be confirmed. Moreover, if the target illuminations of the illumination sampling portions are displayed on a display, the progress status until convergence can be grasped.

Embodiment 13

Next, a lighting control system in which communication between the lighting devices is unnecessary is described. A plurality of lighting devices respectively carry out light variation control separately in parallel. The amount of light variation for light variation control is changed randomly for each of the lighting devices. When a lighting device is judged to be not meeting the aforementioned predetermined condition based on the comparison results and judgment results from the illumination comparing device, all the lighting devices respectively carry out return control to the light intensity prior to the light variation control. After one time of the return control, usually a return is made to the predetermined condition being met, but when this return does not occur, return control is again carried out until a return is made to the predetermined condition being met. Next, light variation control is again carried out with a random amount of light variation. By doing this, return control may sometimes increase temporarily due to excessive light variation, but eventually the sampled illuminations can be made to approach the target illumination.

The aforementioned "random" includes cases such as the following. Namely, the lighting devices may carry out light variation control such that while the light intensity is arbitrary increased/reduced, on average there is light reduction or light increases in one direction. In this case, the light intensities of the light sources may temporarily change to a reverse direction. In other words, the amount of light variation used may be any of a positive, negative, or zero value.

Furthermore, it is also possible to arbitrarily change the size of the amount of light variation in light variation control without changing the direction thereof. In other words, the amount of light variation may be either one of zero or a positive/negative value. In this case, the light intensities change in one direction except when there is return control.

The differential illumination of the sampled illumination and the target illumination is sent to all the lighting devices from the illumination comparing device and the lighting devices may make smaller the value of the amount of light variation randomly changed in response to smaller differential illuminations received. The amount of light intensity for return may be made smaller when conducting return control for smaller differential illuminations. By doing this, constriction to the target illumination can be achieved rapidly and flickering of the illumination in a constricted state can be made smaller.

As described above, instead of conducting return control until the light intensity prior to light variation control, return control may be conducted by only a predetermined amount of light. The amount of light intensity for return when conducting return control may be varied randomly. Since there are times when the aforementioned predetermined condition cannot be met in one time, the return control is carried out until there is a return to a state in which the predetermined condition is met. The differential illumination of the sampled illumination and the target illumination is sent to all the lighting devices from the illumination comparing device and the lighting devices may reduce the amount of return light intensity in the return control in response to smaller differential illuminations received. When the amount of return light intensity in this return control is randomly varied, the amount of light variation for light variation control may be a fixed amount of light or may be an amount of light according to the above-described differential illumination without being varied randomly.

Other Embodiments and Supplement Notes

In addition to a loop-type network, a mesh-type network in which communications can be carried out between the lighting devices respectively, a star-type network, wired communications, wireless communications and the like can be applied to the communications between the lighting devices 50a to 50h in the above-described embodiment 10. Furthermore, a central device that manages all the lighting devices may be arranged in an appropriate location in the network. For example, for a star-type network, a central device that manages all the lighting devices may be arranged in a central position in the network. For the network communications for these devices, communication protocols such as those for commonly known LAN, wireless LAN, infrared LAN, Bluetooth (registered trademark) system, Power Line Communication, or eco-net may be used, or a portion of these protocols may be used.

The illumination comparing device 52 was configured to communicate with the respective lighting devices 50a to 50h, but it is possible for it to communicate only with the lighting device 50a and for the lighting device 50a to manage the information of the other lighting devices 50b to 50h. When the above-described central device is provided, the illumination comparing device 52 may communicate with the central device.

In the above-described embodiment 10, the illumination comparing device 52 may issue multiple instances of the light reduction permission information Dp. By arranging that the lighting devices cannot carry out light reduction processing even when possessing Dp until there is no more "NG"s, there is no excessive application of light reduction processing. The Dp may be set such that each lighting device can only hold one, or the maximum number to be held may be limited and any Dp exceeding that may be set to be forwarded to another lighting device. For a plurality of Dp that are held, only one of these can be used in one time of light reduction processing.

In the above-described embodiment 10, the lighting devices were set to randomly generate a transmission destination address for the Dp, but the Dp may be transmitted to a neighboring lighting device in accordance with the connection order in FIG. 10.

In the foregoing embodiments, as described in embodiment 10, the light reduction processing may be set to wait for a fixed time Ts before being carried out in consideration of a stabilization time for the light intensities of the light sources. Fundamentally, in the foregoing embodiments, each process was described as being performed asynchronously, but the overall system may be configured to operate synchronously in accordance with slots of the time T.

In the foregoing embodiments, a time axis and an amplitude axis (light intensity and illumination) were described as a discrete system, but one or both of the time axis and amplitude axis may be configured as continuous system. For example, by giving the light reduction rate instead of one-steps of the lighting devices and the light-increase rate instead of one-steps of simultaneous light-increase processing, and carrying out light-increase processing during "NG"s and carrying out light reduction processing during "OK"s, it is possible to regulate to the desired illumination distribution using the same principle.

In Embodiment 10, as also described in Embodiment 9, as the occurrence frequency distribution of "OK" and "NG" approach, one step light intensity difference may be made smaller. Furthermore, when multiple instances of Dp are issued, as the occurrence frequency distribution of "OK" and "NG" approach, the number of Dp issued may be reduced. This judgment and processing can be carried out by the illumination comparing device 52.

Each one step of light reduction may be decided in accordance with the resolving power of the light intensity capable of being produced by the light sources and the lighting devices.

In the foregoing embodiments, the width of control for each light source and the value of one step are not necessarily according to the various above-described calculations and described methods, and it is possible to use other values within an appropriate range. The case in which the predetermined amount of light variation is reduced in response to reductions in the differential illumination of the sampled illumination and the target illumination has already been touched upon. A method other than this for reducing the predetermined amount of light variation as constriction advances may be a method such as the following. Each lighting device may total the number of times of light variation control and reduce the predetermined amount of light variation as the number of times of light variation control becomes larger. Also, each lighting device may reduce the predetermined amount of light variation as time passes from the commencement of control. It may be judged that convergence is advancing as the frequency of light variation control and return control approach on average.

A procedure for determining the predetermined amount of light variation from the initial light intensity and the threshold light intensity, for example the procedure of S23 and S24 in FIG. 2, was described as being executed each time prior to the lighting devices carrying out light variation control, but this may be set to be carried out one time for each of a given number of times of light variation control.

The amount of light variation of light intensity in the return control of the lighting devices may be the same size as the predetermined amount of light variation in the light variation control, but it may also be a different size. Furthermore, the amount of light variation of light intensity in the return control of the lighting devices may be a value respectively decided for each lighting device. Likewise for the predetermined amount of light variation, the amount of light variation of light intensity in the return control of the lighting devices may be set to a small value as constriction advances. Furthermore, when conducting the return control, it is possible to return to the amount of light prior to carrying out light variation control.

In the above-described embodiments, the light intensity of the lighting devices is subjected to light reduction from a maximum light intensity, but as has already been touched upon, it is also possible to increase light from a minimum light intensity. For example, in embodiment 6, "OK" and "NO" may be defined in an inverse large-small relation.

Furthermore, it is also possible to commence processing after setting the initial light intensity of the lighting devices to an appropriate light intensity intermediate to the maximum light intensity and the minimum light intensity. In this case, when the relation between the sampled illumination and the target illumination in the current light intensity state of all the lighting devices are not all in a constant relation, the light intensities of all the lighting devices may be changed each time by an appropriate light intensity in a reverse direction to the light variation direction for light variation control of the light intensities, that is, subjected to return control, and the selection of the lighting device j in the foregoing embodiments may be set to commence in the process of light variation processing for that light intensity once the relations of the sampled illuminations and the target illuminations are all a constant relation. By doing this, constriction to the target illumination can be achieved rapidly.

In the foregoing embodiments 1 to 4 and 6 to 12, description was given of light reduction processing or light variation processing being carried out with a single lighting device j each time, but when there are a multitude of lighting appliances, light variation control may be carried out by a plurality of lighting devices in parallel. For example, after light variation control has been carried out by at least one selected lighting device, for example a plurality of lighting devices and when the predetermined judgment of the selected lighting device is that the predetermined condition is met, lighting devices including at least one lighting device other than the selected lighting devices are selected and the light variation control and the predetermined judgment by the judgment control portion are carried out in the selected lighting devices. When the predetermined judgment after the light variation control is that the predetermined condition is not met, the lighting devices including at least one of the selected lighting devices carry out the return control in order to meet the predetermined condition. Combined with the aforementioned process, the sample illumination is made to approach the target illumination. It is preferable for the selected lighting devices to be different devices each time, but they may include a portion of the same lighting devices. The lighting devices to carry out the return control can be set to any of the selected lighting devices, that is, the lighting devices that have immediately prior carried out light variation control, a portion thereof and other lighting devices, or all the lighting devices.

That is to say, in the lighting control system according to the present invention, the light variation control may be carried out by selecting any of the two or more lighting devices, and the selection can be freely changed and selected without any particular constraint to the prior selection. The same is true for the return control. Furthermore, in regard to the amount of light variation in light variation control and return control and the amount of return control, except for the variation direction in the lighting devices, it is possible to various degrees to approach the target illumination using any arbitrary size without any stringent restrictions, and therefore flexible system design is possible. There are various algorithms of selection, but the aforementioned negotiation can be achieved fundamentally.

From the point of view of power saving, a method in which the time density for supplying power to the light sources, such as inverter control or triac control, is preferable for controlling the light intensities of the lighting devices. In this case, the instantaneous light intensity involves repeating in alternation the maximum light intensity and the minimum light intensity, that is, repeating in alternation a light on state and a light off state. The mean light intensity is controlled for the lighting devices. The instantaneous illumination sampled by the illumination sampling portion varies widely in accordance with the instantaneous light intensity, and therefore values in which the instantaneous illumination is smoothed are required to be used as the sampled illumination.

The illumination comparing devices may be arranged in predetermined fixed positions in a hall or a conference room, for example hanging midway between the ceiling and the floor, but they may also be movable to arbitrary positions of the hall or conference room as small size devices such as remote control devices. By doing this, the illumination of the arbitrary positions can be controlled to desired values. For example, a specified position on a conference table can be set to a desired brightness. Furthermore, a user can set the target illumination.

The lighting sampling portion may be set as a sensor that measures the illumination using one direction or a specified direction of light. By providing in positions X and Y a plurality of lighting sampling portions having such directivity and sampling the illumination, then transmitting the comparison results with the respective target illuminations to the lighting devices, the arrival direction characteristics of the lighting in the respective positions X and Y can be controlled to have desired characteristics. By carrying out a primary judgment inside the illumination comparing device as shown in the judgment portion of FIG. 6 on the illuminations measured by a plurality of sensors having different directivity, then collecting the primary judgment results received from the plurality of illumination comparing devices at the lighting devices, a secondary judgment may be carried out at the judgment control portion.

As described in embodiment 11, when the illumination at each position has sufficiently approached the target illumination, flickering of the illumination may be removed by pausing light reduction processing. To this end, in each embodiment, the lighting devices receive from each of the illumination comparing devices information of the difference between the current illumination and the target illumination, and the size of the difference information is determined at the lighting devices, and when all have become sufficiently small values, light reduction processing may be set to be paused. Also, light reduction processing may be set to be paused after a time has elapsed that is several times larger than a maximum time Tmax required for convergence.

In order to commence light reduction processing in each of the embodiments, a start button may be provided in the illumination comparing device and a notification may be given of the commencement of the above-described procedure to all the lighting devices and the other illumination comparing devices by broadcast communications when the button is pushed.

Once a state of convergence has been achieved, the respective light intensities of that time are stored such that even when the power to all the lighting devices is cut, the light intensities can be reproduced when the power is again turned on. Furthermore, when the difference between the sampled illumination and the target illumination in the illumination comparing device becomes too large, the light intensities of all the lighting devices are changed by return control by an appropriate light intensity in a direction reverse to the light variation direction in light variation control, and the selection of the lighting device j in the foregoing embodiments may be set to commence in the process of variation processing for its light intensity once the relations of the sampled illuminations and the target illuminations are all set to a constant relation.

By doing this, it is possible to reach the target illumination in a shorter time than again conducting all the processes from the beginning.

In the foregoing embodiments, the process of multiple light reduction processing may be combined. That is, the light reduction processing of a particular embodiment may proceed at first and at a stage where the target illumination is approached, a transition may be made to light reduction processing according to another embodiment.

When described for a case in which light reduction processing is carried out with light variation control, the above lighting control system according to the present invention is provided with a first procedure of setting the light intensities of a plurality of lighting devices so that sampled illuminations of predetermined positions illuminated by the plurality of lighting devices become larger than the target illuminations, a second procedure of selecting a lighting device j and lowering its light intensity by light variation control, a third procedure of conducting light increases using return control on the light intensities of a plurality of lighting device including the lighting device j when the sampled illuminations become smaller than the target illuminations and making the sampled illuminations larger than the target illuminations, and a fourth procedure of selecting a lighting device other than the lighting device j and lowering its light intensity using light variation control, and the target illuminations are achieved by proceeding with these procedures in an appropriate order. When transitioning from the second procedure to the fourth procedure, there is a method of not going through the third procedure and a method of going through the third procedure. The method of not going through the third procedure was described in embodiment 1, and therefore this is a method in which the light intensities of the lighting devices are lowered in order without exception. The method of going through the third procedure was described in embodiment 6, and therefore this is method in which the light intensities of the lighting devices are lowered quickly to the threshold light intensity. It should be noted that the first procedure and the third procedure can be seen as fundamentally the same category of procedure. Also, the second procedure and the fourth procedure can be viewed as fundamentally the same type of procedure. Accordingly, distinctive elements of the lighting control system according to the present invention are evident in the third procedure (or the first procedure) and the fourth procedure (or the second procedure) as well as in the techniques for judging the sampled illuminations and the target illuminations. The target illumination can be approached using the fourth procedure and the target illumination can be even better reached using the third procedure.

Embodiments of a Control System

The present invention is not limited to controlling light intensities of light sources and using the above-described principles the control of the present invention can be applied to systems having objects of control other than light sources, control amounts other than light intensities, observation information other than illumination, and reference information other than illumination information corresponding to observation information. Namely, for example, a control system can be achieved that has two or more control target devices and a judgment device, wherein the judgment device is provided with a reference information storage portion that stores reference information, an observation information sampling portion that samples observation information, and a judgment portion that judges whether or not the reference information and the observation information meet a predetermined condition and a judgment result in the judgment portion is sent to the two or more control target devices so that the control target devices can control the amount of control based on the judgment result, wherein the control includes variation control of varying a current control value by a predetermined control amount, return control of returning in a reverse direction to the variation direction of the predetermined control amount, or random control, and wherein when a control target device selected by the control target devices has a judgment result that the received judgment result meets a predetermined condition, if a selection of the control target device is changed after the control amount is controlled, the observation information other than illumination is subjected to control to approach the reference information. Whether or not the predetermined condition is met, a predetermined control amount, variation control, return control, the order of each control, and random control or the like can be decided by applying the same solution as in the above-described embodiments.

Figure 11:
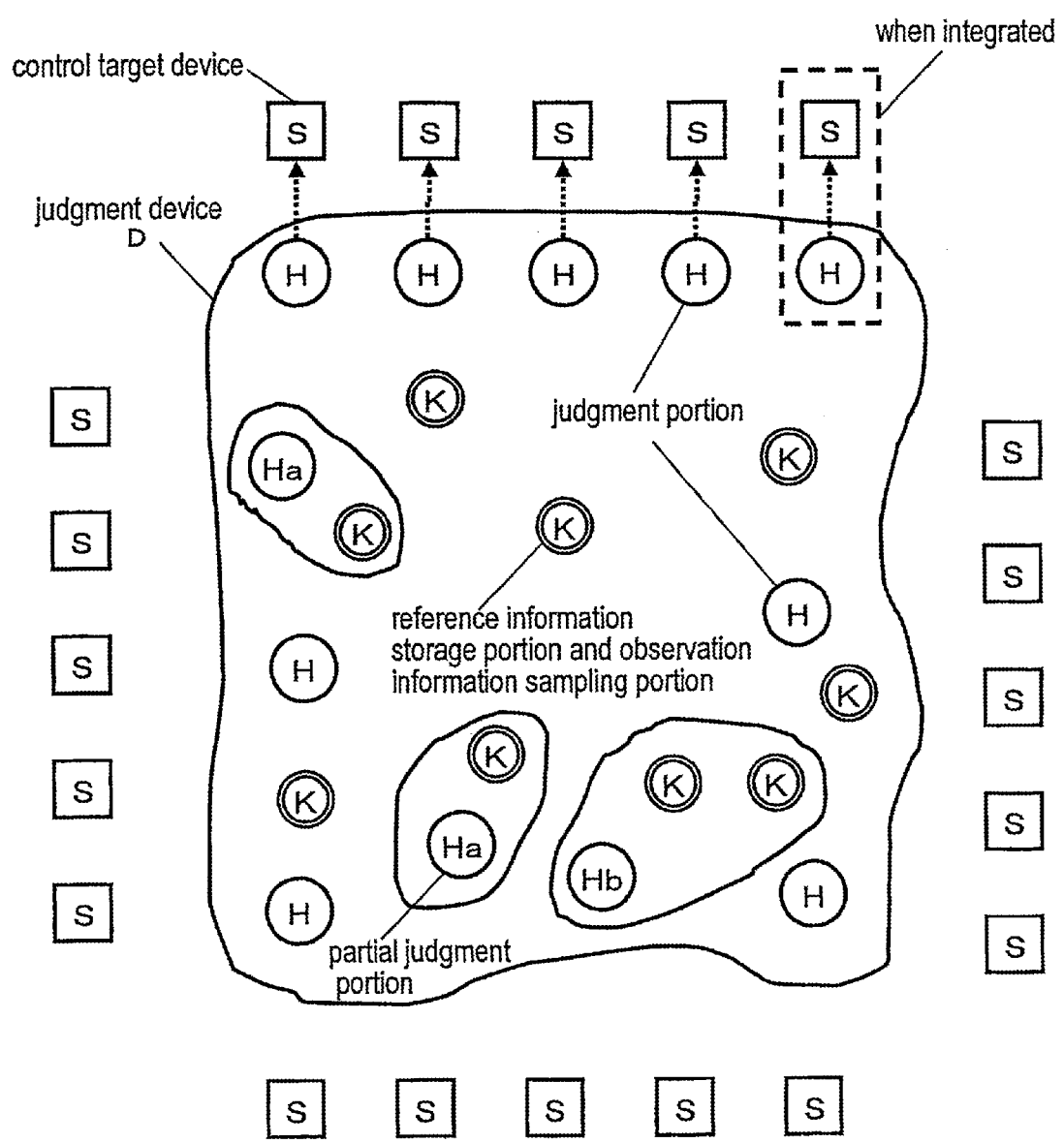
FIG. 11 is a structural view of one embodiment of a control system according to the present invention.

FIG. 11 shows a structural view of one example of this embodiment. In FIG. 11, S is a control target device, a plurality of which are provided. H is a judgment portion. K is a pairing of a reference information storage portion that stores reference information and an observation information sampling portion that samples observation information. In this example a plurality of the respective H and K are provided. Ha and Hb are partial judgment portions and carry out judgment for a portion of the K. H carries out judgment with respect to the state of all the K including the judgment results of the partial judgment portions Ha and Hb. The details of the judgments are the same judgments as the predetermined judgments already described for the lighting control system. Each S carries out variation control and return control according to the judgment results of the judgment device. When the judgment results of the partial judgment portions Ha and Hb are included, the judgment portion carries out the judgments for all the K, and therefore the judgment result of whichever H is the same. Accordingly, S may acquire a judgment result form whichever H. As shown by the arrows of the dashed lines, judgment results may be acquired from a specific H. Each S and each H may be arranged physically separated as in FIG. 11, and a single S and a single H may be integrated. When a single S and a single H are integrated, the S thereof acquires judgment results from the H thereof. A portion or all of the H, Ha, Hb, and K may be positioned dispersed and may be integrated. For example, one each of the K and the Ha may be integrated.

The number of K and H may be an arbitrary number of one or more. The Ha and Hb may sometimes not be provided.

In a configuration the same as FIG. 11, the target object devices may be controlled randomly with a control amount in the same manner as described for the lighting control system.

Information transmission between each of the S and H and information transmission between the K and Ha/Hb as well as the K and H may be wired transmission and may be wireless transmission. Since it is not necessary for the devices to specify each other, broadcast communications can be applied.

By reading portions that carry out control of amounts of light of a lighting device and light source portions as "control target device," portions that carry out judgment in judgment control devices in the lighting devices, comparing portions of the illumination comparing devices, and judgment portions as "judgment portions of judgment devices of a control system," illumination sampling portion as "observation information sampling portion," target illumination information as "reference information," and illumination information storage portion as "reference information storage portion" respectively, the configurations, operations, and procedures described in the embodiments of the lighting control system can be applied to the present control system. Furthermore, a configuration such as that of FIG. 11 can also be applied to a lighting control system.

Moreover, all the lighting control and control system processes in the aforementioned embodiments may be achieved by software. And such software may be distributed by way of a software download or the like. Furthermore, such software may be disseminated by being recorded on a recording medium such as a CD-ROM.

INDUSTRIAL APPLICABILITY

The lighting control system of the present invention is useful as a lighting system capable of controlling a predetermined position to a desired illumination.

The invention claimed is:

1. A control system, having two or more control target devices and one or more judgment devices,
   wherein the judgment device is provided with a reference information storage portion that stores reference information, an observation information sampling portion that samples observation information, and a judgment portion that judges whether or not the reference information and the observation information meet a predetermined condition, and sends a judgment result of the judgment portion to the two or more control target devices,
   the control target devices can control a control amount based on the judgment result and the control includes variation control, in which a current control value is changed by a predetermined control amount, and return control, in which a return is made to a reverse direction to a direction of change of a predetermined control amount, and
   the judgment portion carries out a judgment as to whether or not the predetermined condition is met after at least one selected control target device from the control target devices carries out the variation control at least one time, after which a control target device including at least one control target device other than the selected control target device is selected and, after the variation control has been carried out at least one time in the new selected control target device, the judgment portion of the selected control target device carries out the judgment and when the judgment portion judges that the predetermined condition is unmet, the control target devices including at least one of the selected control target devices carry out the return control to make the observation information approach the reference information in order to meet the predetermined condition.

2. The control system according to claim 1, wherein after at least one control target device is selected and variation control is performed when the judgment result meets the predetermined condition, and a control target device including at least one control target device other than the selected control target device is selected and subjected to variation control when the predetermined condition is met, and when the predetermined condition becomes unmet, return control is performed with a control amount of the control target devices including at least one control target device other than the selected control target device to meet the predetermined condition, after which a control target device including at least one control target device other than the selected control target device is selected and variation control is repeated to perform control such that all the observation information is made to approach the corresponding reference information.

3. The control system according to claim 1, wherein at least one control target device is selected and the variation control is performed until the predetermined condition becomes unmet when the judgment result meets the predetermined condition, and when the predetermined condition becomes unmet, return control is performed with a control amount of the control target devices including at least one control target device other than the selected control target device to meet the predetermined condition, after which a control target device including at least at one control target device other than the selected control target device is selected and variation control is repeated to perform control such that all the observation information is made to approach the corresponding reference information.

4. The control system according to claim 1, wherein at least one control target device is selected and the variation control is performed until the predetermined condition becomes unmet when the judgment result meets the predetermined condition, and when the predetermined condition becomes unmet, variation control is performed on a control amount of all the control target devices excluding the selected control target devices, and when a relation reverse to the constant relation does not occur at all points of observation, control amounts of all the control target devices excluding the selected control target devices are subjected to return control in a previous direction, and after the predetermined condition becomes met by return control being conducted on the control amounts of the selected control target devices in a previous direction, a control target device including at least at one control target device other than the selected control target device is selected and variation control is repeated to perform control such that all the observation information is made to approach the corresponding reference information.

5. The control system according to claim 1, wherein prior to selection of the control target devices, the control amounts of all the control target devices are set to a maximum value or a minimum value in order to meet the predetermined condition, or return control is conducted on the control amounts of all the control target devices to meet the predetermined condition.

6. The control system according to claim 1, wherein when the reference information storage portion stores a single set of reference information, and the observation information sampling portion samples a single set of observation information, the judgment result is that the predetermined condition is met when the observation information and the corresponding reference information are in a constant relation, and the judgment result is that the predetermined condition is unmet when not in a constant relation, and when the reference information storage portion stores two or more sets of reference information and the observation information sampling portion samples two or more sets of observation information, the judgment result is that the predetermined condition is met when the two or more sets of observation information are all in a constant relation with the corresponding two or more sets of reference information, and the judgment result is that the predetermined condition is unmet when even one is not in a constant relation.

7. The control system according to claim 6, wherein the in a constant relation is a relation in which the observation information is larger than the corresponding reference information and in case of this relation the variation control is a control in which the observation information is lowered.

8. The control system according to claim 6, wherein the in a constant relation is a relation in which the observation information is smaller than the corresponding reference information and in case of this relation the variation control is a control in which the observation information is increased.

9. The control system according to claim 1, wherein a control width of at least one of the control amount of the control target device and a control amount of the return control is set for each of the control target devices.

10. The control system according to claim 1, wherein a control width of at least one of the control amount of the control target device and a control amount of the return control is reduced in response to a convergence, or reduced along with a passing of time until convergence.

11. The control system according to claim 1, wherein a selection number of the selected control target devices is made to approach one in response to a convergence.

12. A control target device comprising the control system according to claim 1.

13. A judgment device comprising the control system according to claim 1.

14. A control system, being a control system having two or more control target devices and one or more judgment devices,
wherein the judgment device is provided with a reference information storage portion that stores reference information, an observation information sampling portion that samples observation information, and a judgment portion that judges whether or not the reference information and the observation information meet a predetermined condition, and sends a judgment result of the judgment portion to the two or more control target devices,
the control target devices can control a control amount based on the judgment result and the control includes variation control, in which a current control value is changed by a predetermined control amount, and return control, in which a return is made to a reverse direction to a direction of change of a predetermined control amount,
the control target devices respectively carry out the variation control and, after the variation control, when the predetermined judgment is that a predetermined condition is unmet, the control target devices carry out the return control in order to meet the predetermined condition, and
the observation information of the control target devices is made to approach the reference information by setting an amount of variation in the variation control as one of an amount varied randomly based on a predetermined amount of variation, an amount that is a return variation amount in the return control randomly varied, or an amount in which both are randomly varied.

15. A control system, being a control system having two or more control target devices and one or more judgment devices,
wherein the judgment device is provided with a reference information storage portion that stores reference information, an observation information sampling portion that samples observation information, and a comparison portion that compares the reference information and the observation information, and sends a comparison result to the control target devices,
the control target device control a control amount based on the judgment result, and
at least one of the control target devices randomly changes the amount of control and the observation information is made to approach the reference information by narrowing a range in which the judgment control portion randomly changes the amount of control based on the received comparison result.

16. The control system according to claim 15, wherein all the control target devices randomly change the respective amount of control and the observation information is made to approach the reference information by narrowing a range in which the control target devices randomly change the control amounts based on the received comparison result.

17. The control system according to claim 15, wherein a plurality of judgment devices are provided, the control target devices total the comparison results received from the plurality of judgment devices to calculate an evaluation value and the observation information is made to approach the reference information by narrowing a range of randomly changed control amounts based on the evaluation value.

18. The control system according to claim 15, wherein the judgment device compares the observation information and the reference information in the comparison portion and sends difference information as the comparison result so that the received comparison result is evaluated in at least one of the control target devices, and narrows a range in which the control amounts are randomly changed so as to increase an occurrence rate of control amounts corresponding to evaluations of small difference information to make the observation information approach the reference information.

19. The control system according to claim 15, wherein the judgment device transmits large-small information indicating which of the observation information and the reference information is larger, and at least one of the control target devices narrows a range in which the control amounts are randomly changed so as to counterbalance large information and small information of the large-small information based on the received comparison result to make the observation information approach the reference information.

* * * * *